US012697812B2

(12) United States Patent
Mori et al.

(10) Patent No.: US 12,697,812 B2
(45) Date of Patent: Aug. 4, 2026

(54) LIQUID DISCHARGE HEAD AND RECORDING APPARATUS

(71) Applicant: CANON KABUSHIKI KAISHA, Tokyo (JP)

(72) Inventors: Tatsurou Mori, Tokyo (JP); Takuya Iwano, Tokyo (JP); Tomoki Tsuji, Kanagawa (JP); Marcel Van Der Veen, Venlo (NL); Henricus Gerardus Jozef Boerstal, Velden (NL); Petrus Wilhelmus Antonius Maria Aerts, Tienray (NL)

(73) Assignee: Canon Kabushiki Kaisha, Tokyo (JP)

( * ) Notice: Subject to any disclaimer, the term of this patent is extended or adjusted under 35 U.S.C. 154(b) by 120 days.

(21) Appl. No.: 18/736,345

(22) Filed: Jun. 6, 2024

(65) Prior Publication Data

US 2024/0408868 A1 Dec. 12, 2024

(30) Foreign Application Priority Data

Jun. 8, 2023 (JP) ................................ 2023-094738

(51) Int. Cl.
*B41J 2/14* (2006.01)

(52) U.S. Cl.
CPC ........ *B41J 2/14* (2013.01); *B41J 2002/14491* (2013.01)

(58) Field of Classification Search
CPC ......................... B41J 2/14; B41J 2002/14491; B41J 2/14072; B41J 2/14201; B41J 2/16585; B41J 2/17526; B41J 2/1753; B41J 2/1754; B41J 2002/14419; B41J 2002/14362
USPC ........................................................... 347/20
See application file for complete search history.

(56) References Cited

U.S. PATENT DOCUMENTS

2014/0038458 A1* 2/2014 Bausch ............... H01R 12/714 29/874

FOREIGN PATENT DOCUMENTS

| | | |
|---|---|---|
| JP | 2014004767 A * | 1/2014 |
| JP | 2020151900 A * | 9/2020 |
| JP | 6784133 B2 * | 11/2020 |

* cited by examiner

*Primary Examiner* — Mark Edwards
(74) *Attorney, Agent, or Firm* — Canon U.S.A., Inc. IP Division

(57) ABSTRACT

A liquid discharge head includes a liquid discharge unit, a housing, an electrical connection portion, and a connection portion cover member. The liquid discharge unit discharges liquid, the housing covers the liquid discharge unit, and the electrical connection portion is electrically connected to an electrical wiring substrate of a recording apparatus. The connection portion cover member covers the electrical connection portion. Power is supplied from the recording apparatus to the liquid discharge unit via the electrical connection portion. The housing includes a recessed portion into which the connection portion cover member is to be inserted. The connection portion cover member includes an insertion portion insertable into the recessed portion. The insertion portion is covered by the recessed portion.

24 Claims, 29 Drawing Sheets

LIQUID DISCHARGE HEAD AND RECORDING APPARATUS

BACKGROUND

Field

The present disclosure relates to a liquid discharge head and a recording apparatus.

Description of the Related Art

Among recording apparatuses for recording images, characters, and the like, inkjet recording apparatuses include liquid discharge heads for discharging liquid onto recording media. In particular, an inkjet recording apparatus used for professional use, such as business use, commercial use, and industrial use, is demanded to be highly durable, in other words, usable for a long time. Thus, the liquid discharge head mounted on the inkjet recording apparatus is also required to be highly durable. One of factors that degrade the durability of the liquid discharge head is, for example, the intrusion of liquid into an electrical connection portion between the inkjet recording apparatus and the liquid discharge head. Examples of factors that cause the intrusion of liquid into the electrical connection portion include a liquid drip from the liquid connection portion occurring when the liquid discharge head is attached to and detached from the recording apparatus, and mist generated when the liquid such as ink is discharged. In a case where liquid enters the electrical connection portion between the inkjet recording apparatus and the liquid discharge head, an electrical circuit may be short-circuited, which may lead to a breakdown in the liquid discharge head.

As a method for solving the above described issue, Japanese Patent Application Laid-open No. 2014004767 discusses a liquid discharge head including an electrical connection portion cover member for covering an electrical connection portion between a recording apparatus and the liquid discharge head. With this configuration, the electrical connection portion cover member is attached to a housing of the liquid discharge head in such a manner to cover the electrical connection portion, thus preventing liquid from entering the electrical connection portion. Further, the electrical connection portion cover member includes protruding portions for pressing the housing of liquid discharge head. The protruding portions pressing the housing prevent the electrical connection portion cover member from dropping off from the housing of the liquid discharge head.

However, in the configuration discussed in Japanese Patent Application Laid-open No. 2014004767, the protruding portions of the electrical connection portion cover member press the housing of the liquid discharge head, but the electrical connection portion cover member itself including the protruding portions is not inserted into any portions. Thus, although the housing and the electrical connection portion cover member are fixed to some extent with the pressing forces of the protruding portions, the electrical connection portion cover member may relatively easily drop off from the housing of the liquid discharge head in a case where an unintentional external force or the like is applied to the electrical connection portion cover member.

SUMMARY

The present disclosure is directed to a liquid discharge head capable of preventing liquid from entering the electrical connection portion of the liquid discharge head, and reducing the possibility of the electrical connection portion cover member unintentionally dropping off from the housing of the liquid discharge head, and a recording apparatus using the liquid discharge head.

According to an aspect of the present disclosure, a liquid discharge head includes a liquid discharge unit configured to discharge liquid, a housing configured to cover the liquid discharge unit, an electrical connection portion configured to be electrically connected to an electrical wiring substrate of a recording apparatus, and a connection portion cover member configured to cover the electrical connection portion, wherein power is supplied from the recording apparatus to the liquid discharge unit via the electrical connection portion, wherein the housing includes a recessed portion into which the connection portion cover member is to be inserted, wherein the connection portion cover member includes an insertion portion insertable into the recessed portion, and wherein the insertion portion is covered by the recessed portion.

Further features of the present disclosure will become apparent from the following description of exemplary embodiments with reference to the attached drawings.

DESCRIPTION OF THE EMBODIMENTS

Hereinbelow, exemplary embodiments of the present disclosure will be described with reference to the attached drawings. Note that the exemplary embodiments described below are not intended to limit the range of the present disclosure, and not all the combinations of the features described in the exemplary embodiments are necessarily essential for the solution of the present disclosure. In addition, the same reference numbers are assigned to the same components.

A first exemplary embodiment of the present disclosure will be described. In the present exemplary embodiment, a description will be provided of a method of discharging liquid using piezoelectric elements that generate pressure by application of voltage. The present disclosure is also applicable to the liquid discharge head that employs a thermal method of discharging liquid using thermoelectric conversion elements, or other various liquid discharge methods.

The present exemplary embodiment employs an inkjet recording apparatus that has a configuration of circulating liquid, such as ink, between a tank and a liquid discharge head, but may have other configurations. For example, without circulating ink, the inkjet recording apparatus may include two tanks on an upstream side and a downstream side of the liquid discharge head, and cause ink in a pressure chamber to flow by causing the ink to flow from one tank to the other tank.

Figure 1:
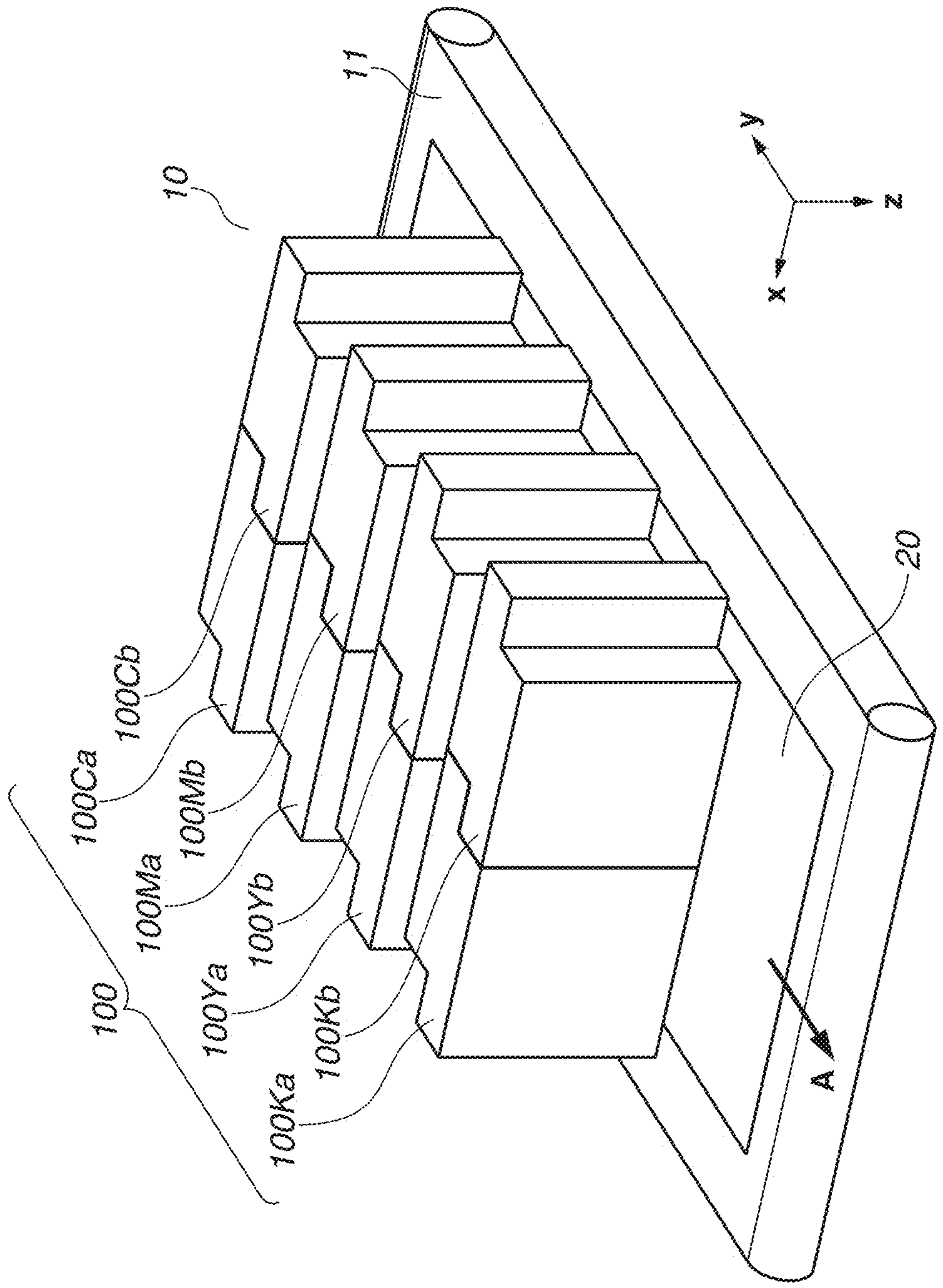
FIG. 1 is a perspective view of a recording apparatus.

FIG. 1 is a perspective view of a recording apparatus 10 according to the present exemplary embodiment. The recording apparatus 10 according to the present exemplary embodiment is a one-pass type inkjet recording apparatus that records images or the like by moving a recording medium 20 relative to liquid discharge heads 100 (i.e., liquid discharge head pairs of 100Ca and 100Cb, 100Ma and 100Mb, 100Ya and 100Yb, and 100Ka and 100Kb, hereinafter each pair may be referred to as a liquid discharge head 100). Each of the liquid discharge heads discharges liquid and is arranged across the entire width of the recording medium 20. The recording medium 20 is conveyed in the arrow A direction by a conveyance unit 11 and is subjected to image recording by the liquid discharge heads 100. The recording apparatus 10, which is an inkjet recording apparatus, according to the present exemplary embodiment includes two liquid discharge heads in each of arrays "a" and "b", for each of cyan (C), magenta (M), Yellow (Y), and black (K). The arrangement of the liquid discharge heads 100 and the number of the liquid discharge heads 100 are not limited thereto.

Figure 2:
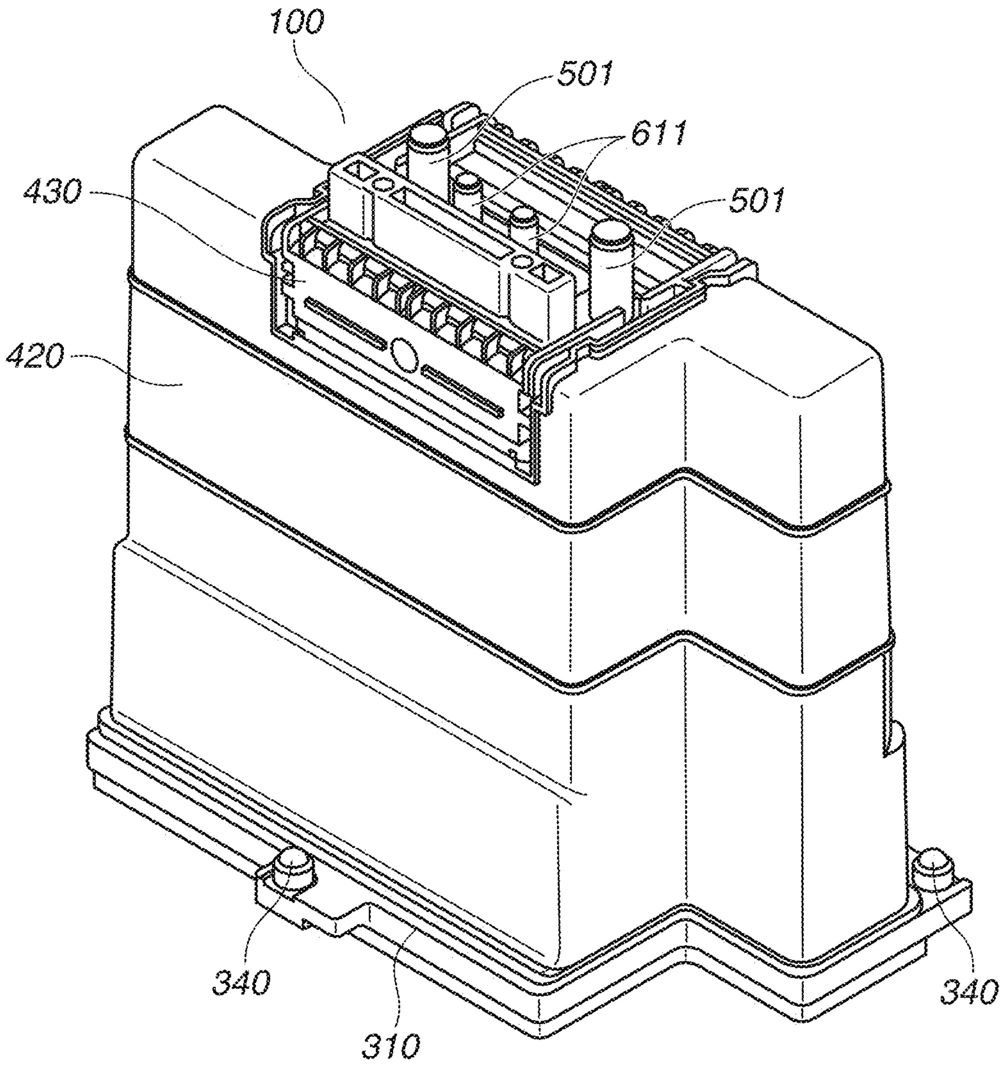
FIG. 2 is a perspective view of a liquid discharge head.
Figure 3:
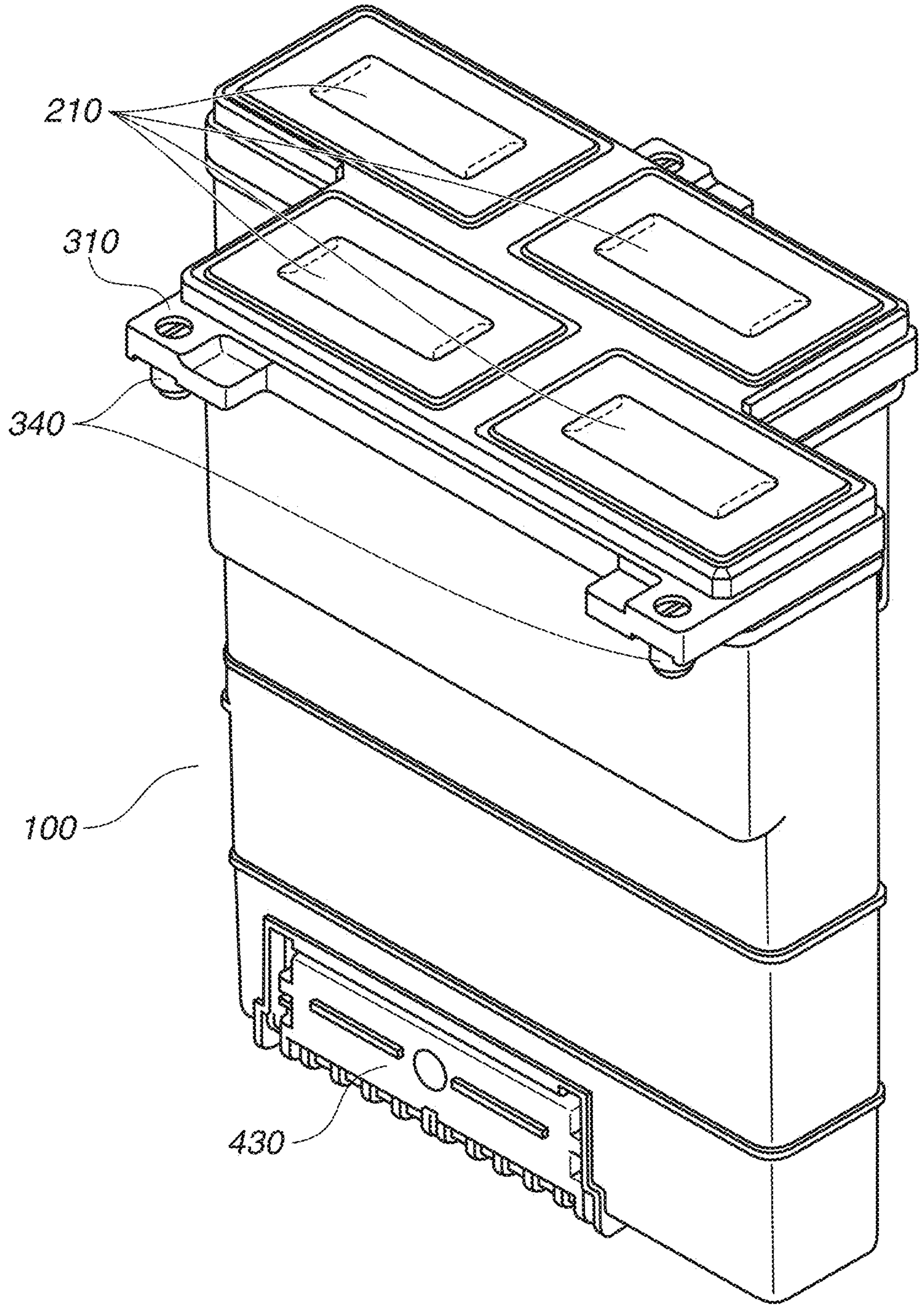
FIG. 3 is a perspective view of the liquid discharge head.
Figure 4:
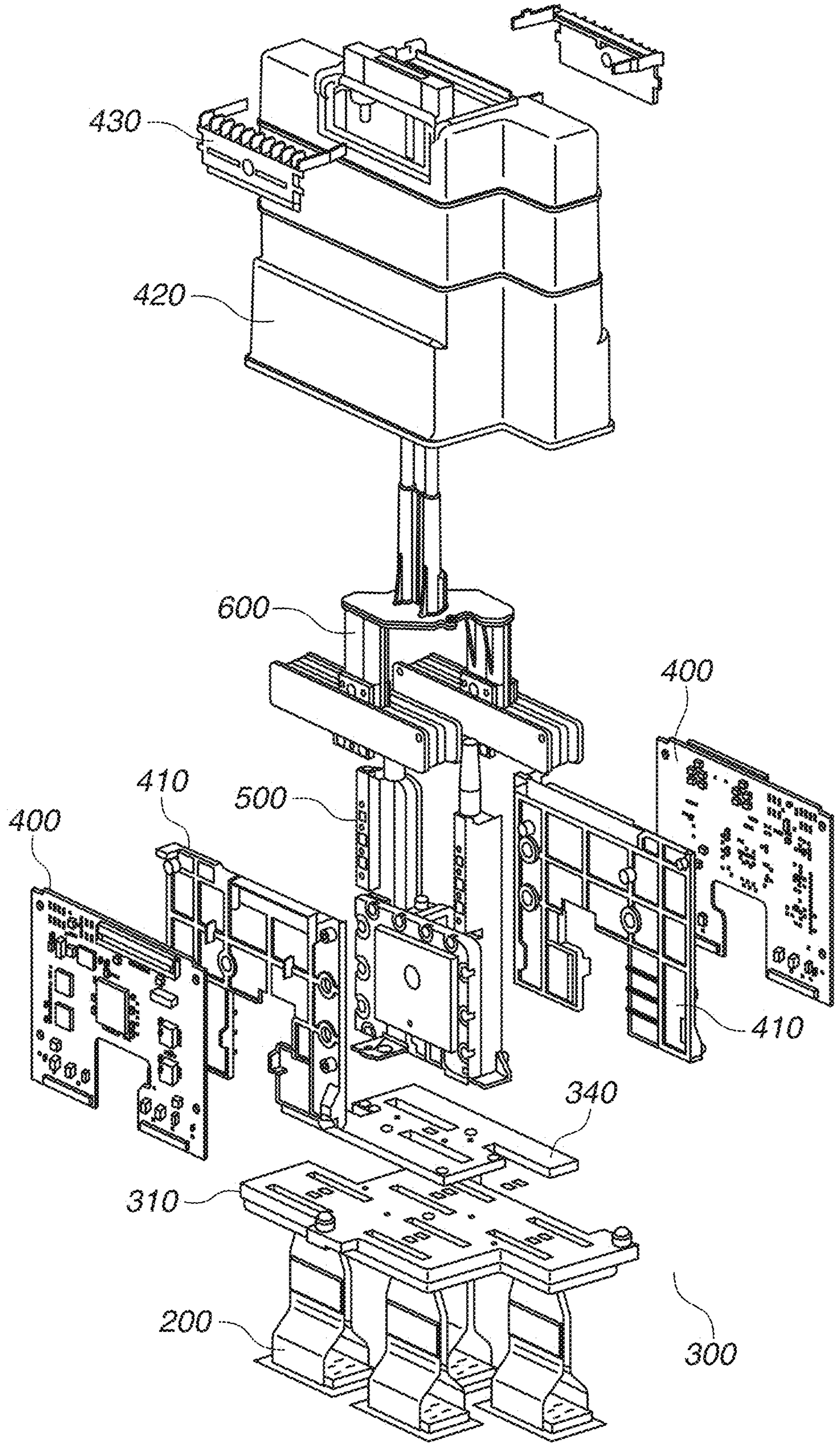
FIG. 4 is an exploded perspective view of the liquid discharge head.

A configuration of the liquid discharge head 100 according to the present exemplary embodiment is now described. FIGS. 2 and 3 are perspective views of the liquid discharge head 100 according to the present exemplary embodiment, and FIG. 4 is an exploded perspective view of the liquid discharge head 100. In the liquid discharge head 100 according to the present exemplary embodiment, four recording element substrates 210 each capable of discharging liquid are arranged on a support member 310 in a staggered manner. The number of the recording element substrates 210 is not limited to four, and the recording element substrates 210 do not have to be arranged in a staggered manner. Further, the liquid discharge head 100 is positioned relative to the recording apparatus 10 by reference members 340. At a substantially center of an upper end portion of the liquid discharge head 100 (housing), ink connection portions 501 and refrigerant connection portions 611, serving as liquid connection portions, are disposed. The ink connection portions 501 and the refrigerant connection portions 611 are connected to ink supply portions and refrigerant supply portions, respectively, in the recording apparatus 10, so that the liquids, such as ink and refrigerant, are supplied into the liquid discharge head 100. An outer case of the liquid discharge head 100 includes a housing 420 covering liquid discharge units 200 each of which discharges liquid. Further, the housing 420 includes electrical connection portion cover members 430 covering electrical connection portions 402 that connect to an electrical wiring substrate 12 (see FIG. 23B) of the recording apparatus 10. In the present exemplary embodiment, the two electrical connection portions 402 and the two electrical connection portion cover members 430 are disposed for the single liquid discharge head 100, but this is not restrictive. In a case where the liquid discharge head 100 includes at least two electrical connection portions 402 and two electrical connection portion cover members 430, it is desirable that the at least two electrical connection portion cover members 430 face each other in such a manner to sandwich the liquid connection portions as illustrated in FIGS. 23A and 23B.

Figure 23A:
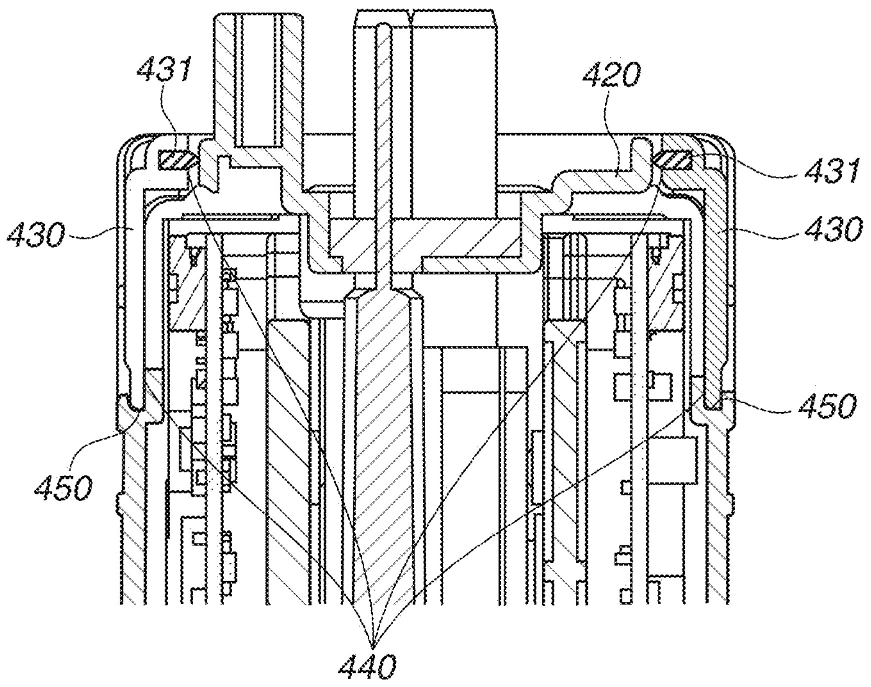
FIG. 23A is a section view illustrating a state where the liquid discharge head and electrical wiring substrates are not connected.
Figure 23B:
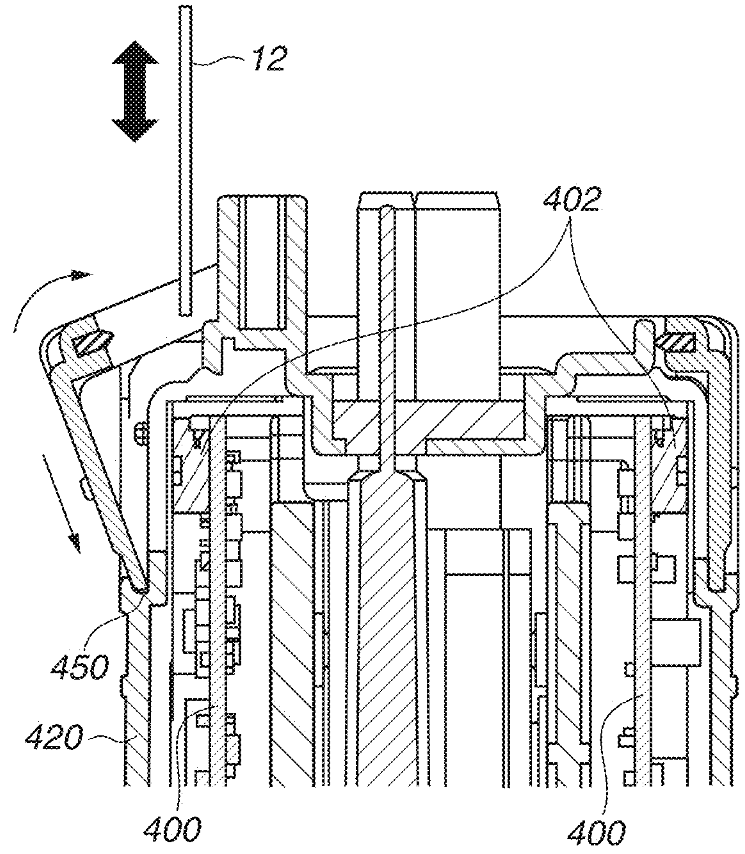
FIG. 23B is a section view illustrating a state immediately before the liquid discharge head and an electrical wiring substrate are connected.

If liquid leaks out from the ink connection portions 501 to the left side in FIGS. 23A and 23B, the liquid may adhere to the electrical connection portion cover member 430 on the left side in FIGS. 23A and 23B. In this case, the electrical connection portion cover member 430 on the right side in FIGS. 23A and 23B is located on the opposite side, so that the possibility of the liquid adhering to the electrical connection portion cover member 430 on the right side reduces. Accordingly, the at least two electrical connection portion cover members 430 are disposed to face each other with the liquid connection portions sandwiched therebetween as illustrated in FIGS. 23A and 23B, so that the electrical connection portion cover members 430 on the right and left sides in FIGS. 23A and 23B are prevented from both becoming dirty with the liquid.

The liquid discharge head 100 includes a support unit 300 including a support member 310, electrical relay substrates 400, and electrical relay substrate support members 410 for holding the respective electrical relay substrates 400. The liquid discharge head 100 includes a liquid supply unit 500 for supplying liquid to the liquid discharge units 200 via the support unit 300, and a cooling unit 600 for cooling one or more drive circuits. In this way, the electrical relay substrates 400 are arranged inside the housing 420. The support member 310 is arranged between the liquid discharge units 200 and the housing 420. Hereinbelow, a configuration of each portion of the liquid discharge head 100 will be described in detail.

Figure 5:
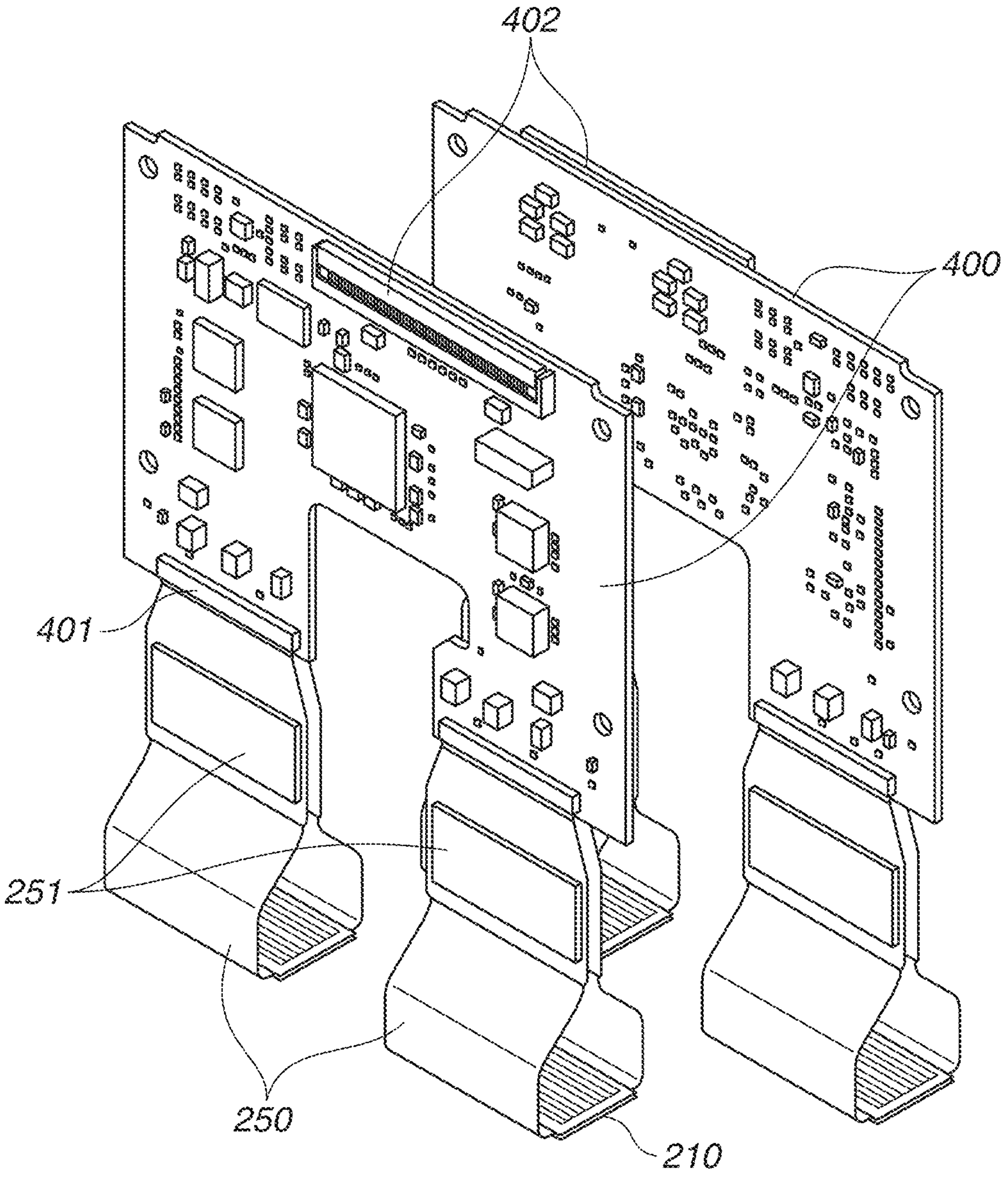
FIG. 5 is a perspective view illustrating an electrical connection configuration of the liquid discharge head.

FIG. 5 is a perspective view illustrating an electrical connection configuration of the liquid discharge head 100 according to the present exemplary embodiment. The liquid discharge head 100 includes, as the electrical connection configuration, the electrical connection portions 402, the electrical relay substrates 400, electrical connection terminals 401, and flexible wiring substrates 250. The recording apparatus 10 and the liquid discharge head 100 are electrically connected by the electrical wiring substrates 12 (see FIG. 25) and the electrical relay substrates 400 being connected at the electrical connection portions 402. The electrical relay substrates 400 supply (relay) power supplied from the recording apparatus 10 to the flexible wiring substrates 250 via the electrical connection terminals 401. The power supplied to the flexible wiring substrates 250 is supplied to the recording element substrates 210 via electrode portions 212 (see FIG. 9) described below. Thus, liquid discharge derive signals and the power to be used to discharge liquid from the liquid discharge head 100 are supplied from the recording apparatus 10 to the liquid discharge heads 100. In other words, the electrical power is supplied from the recording apparatus 10 to the liquid discharge units 200 via the electrical connection portions 402. Consolidating wiring by the electrical circuits in the electrical relay substrates 400 reduces the number of terminals of the electrical connection portions 402 compared with the number of terminals of the recording element substrates 210. This reduces the number of the electrical connection portions 402 to be disposed to attach and detach the liquid discharge head 100 to and from the recording apparatus 10. In addition, it is desirable that the electrical connection portions 402 are formed at end portions of the electrical relay substrates 400.

Figure 6:
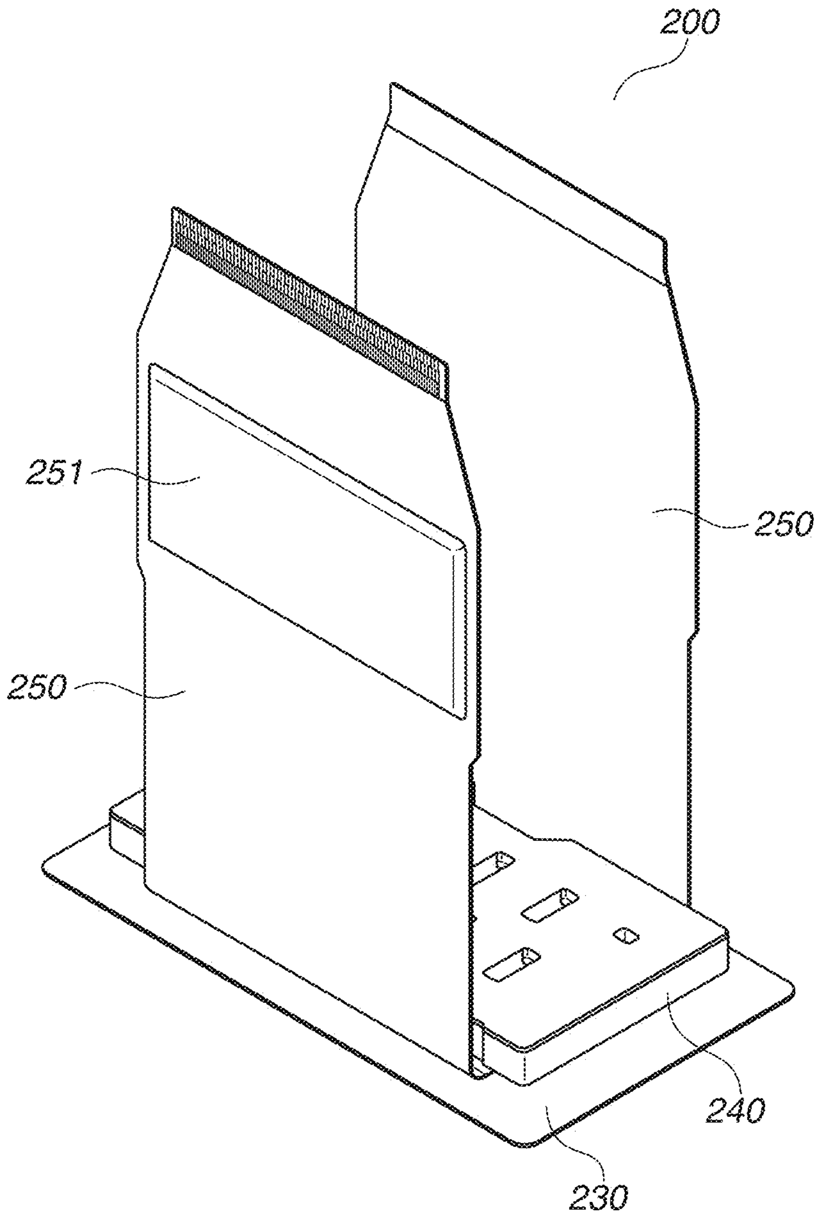
FIG. 6 is a perspective view of a liquid discharge unit.
Figure 7:
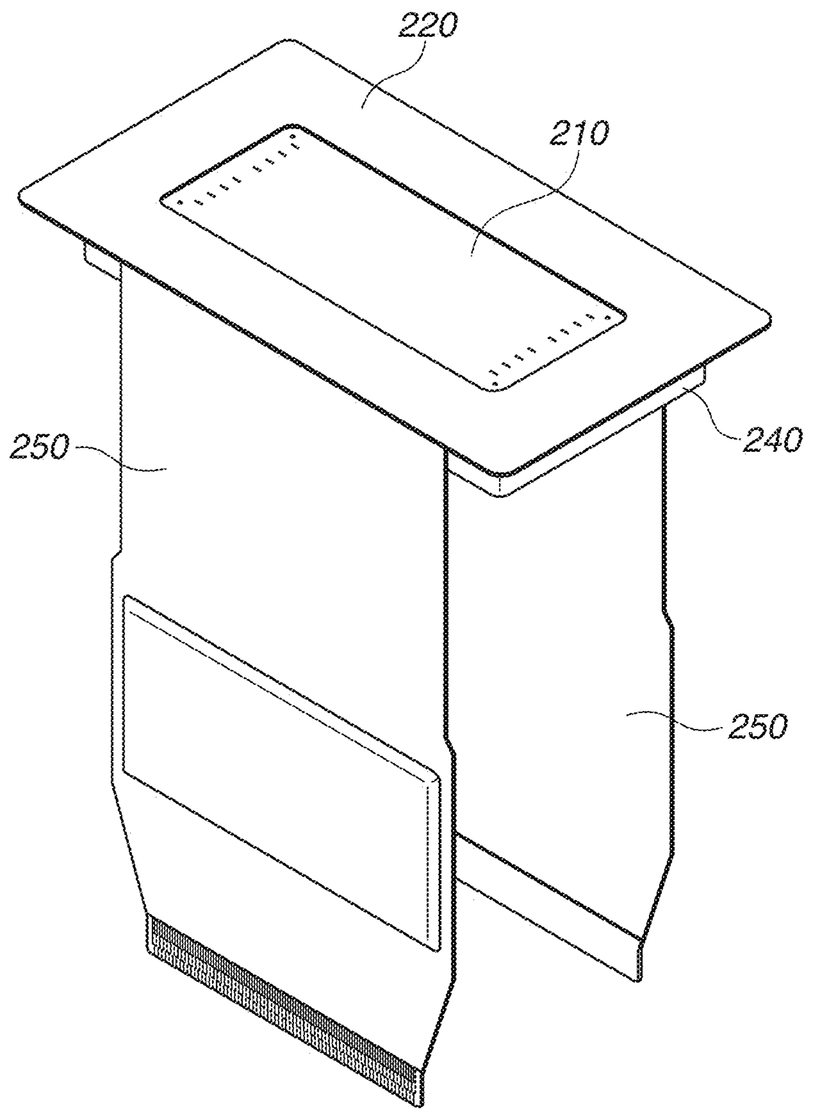
FIG. 7 is a perspective view of the liquid discharge unit.
Figure 8:
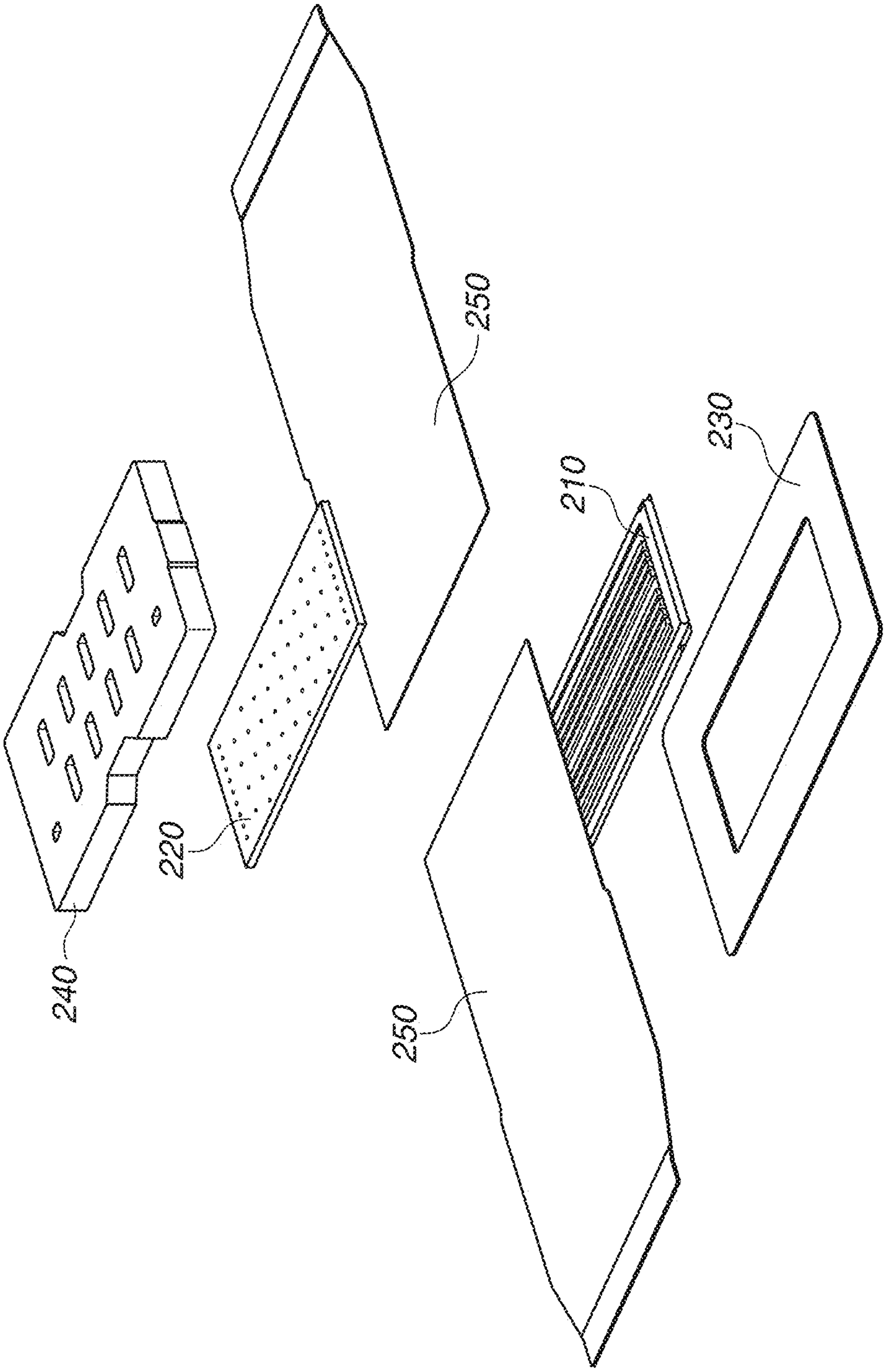
FIG. 8 is an exploded perspective view of the liquid discharge unit.

FIGS. 6 and 7 are perspective views of the liquid discharge unit 200, and FIG. 8 is an exploded perspective view of the liquid discharge unit 200. The liquid discharge unit 200 includes the recording element substrate 210 including pressure generation elements for generating pressure to discharge liquid. The liquid discharge unit 200 further includes a recording element substrate flow path member 220 for supplying liquid to the recording element substrate 210, a flow path member 240, and a recording element substrate support member 230 to be joined to the discharge surface side of the recording element substrate 210. As the pressure generation element, a piezoelectric element configured to be driven by voltage application is desirable. The piezoelectric element has generally a longer life-span than a thermoelectric conversion element that is a thermal type pressure generation element. For a thermoelectric conversion element type recording apparatus, the number of times of replacing the liquid discharge head tends to increase. Accordingly, the present disclosure is more desirable for the recording apparatus that employs piezoelectric elements.

Figure 9:
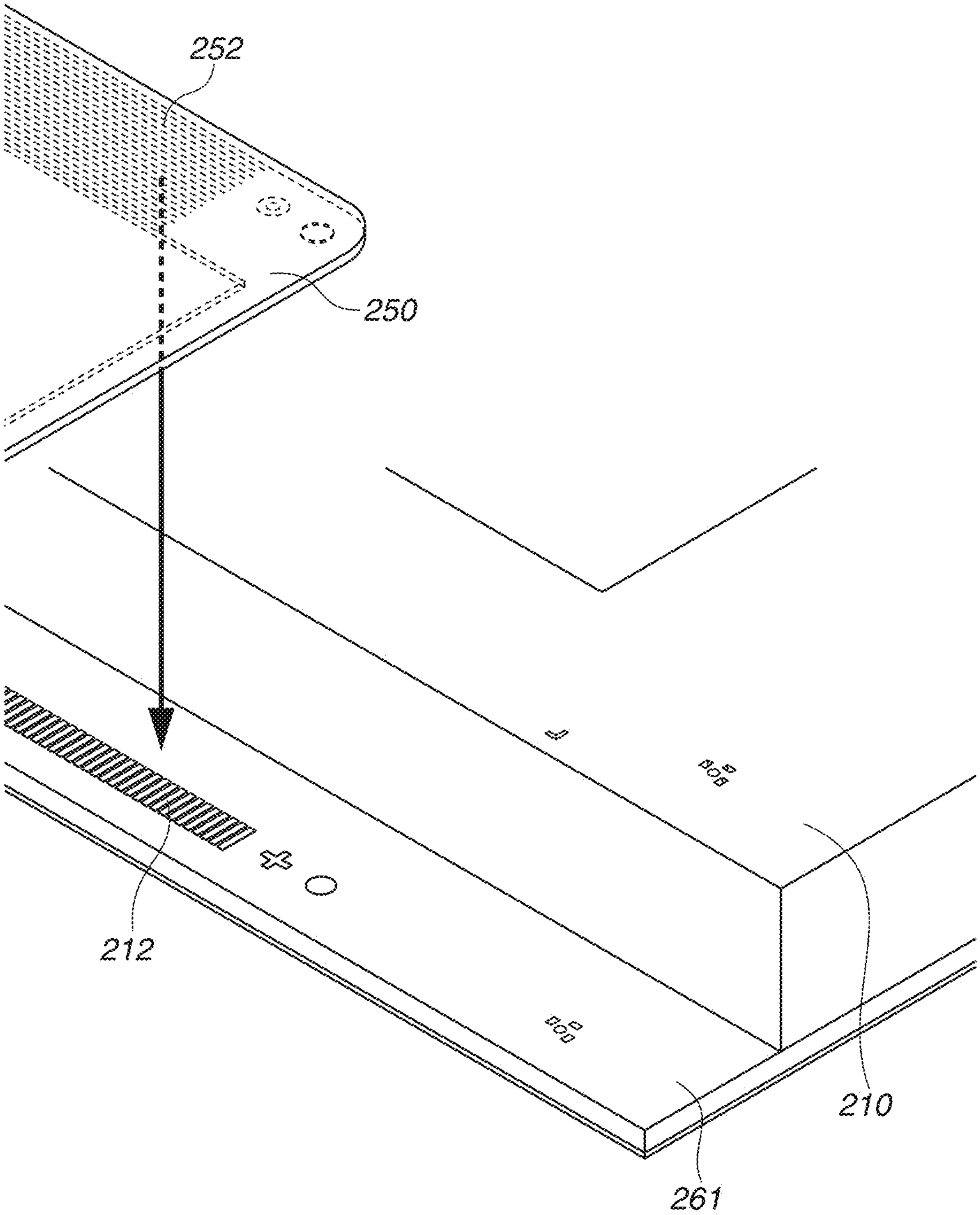
FIG. 9 is an enlarged view of an electrode portion of the liquid discharge unit.

FIG. 9 is an enlarged view of the electrode portion 212 of the liquid discharge unit 200. As illustrated in FIG. 9, the electrode portion 212 is provided on each of thin substrate portions 261 located on both ends of the recording element substrate 210. A first electrical connection portion 252 of the flexible wiring substrate 250 and the electrode portion 212 are brought into contact so that the recording element substrate 210 and the flexible wiring substrate 250 are electrically connected. The recording element substrate support member 230 is joined to the discharge surface side of the thin substrate portion 261, to prevent liquid from entering the electrical connection portion, and to reinforce the thin substrate portion 261 of the recording element substrate 210. The flexible wiring substrate 250 is provided with a drive circuit substrate 251 for driving recording elements on the recording element substrate 210.

Figure 10:
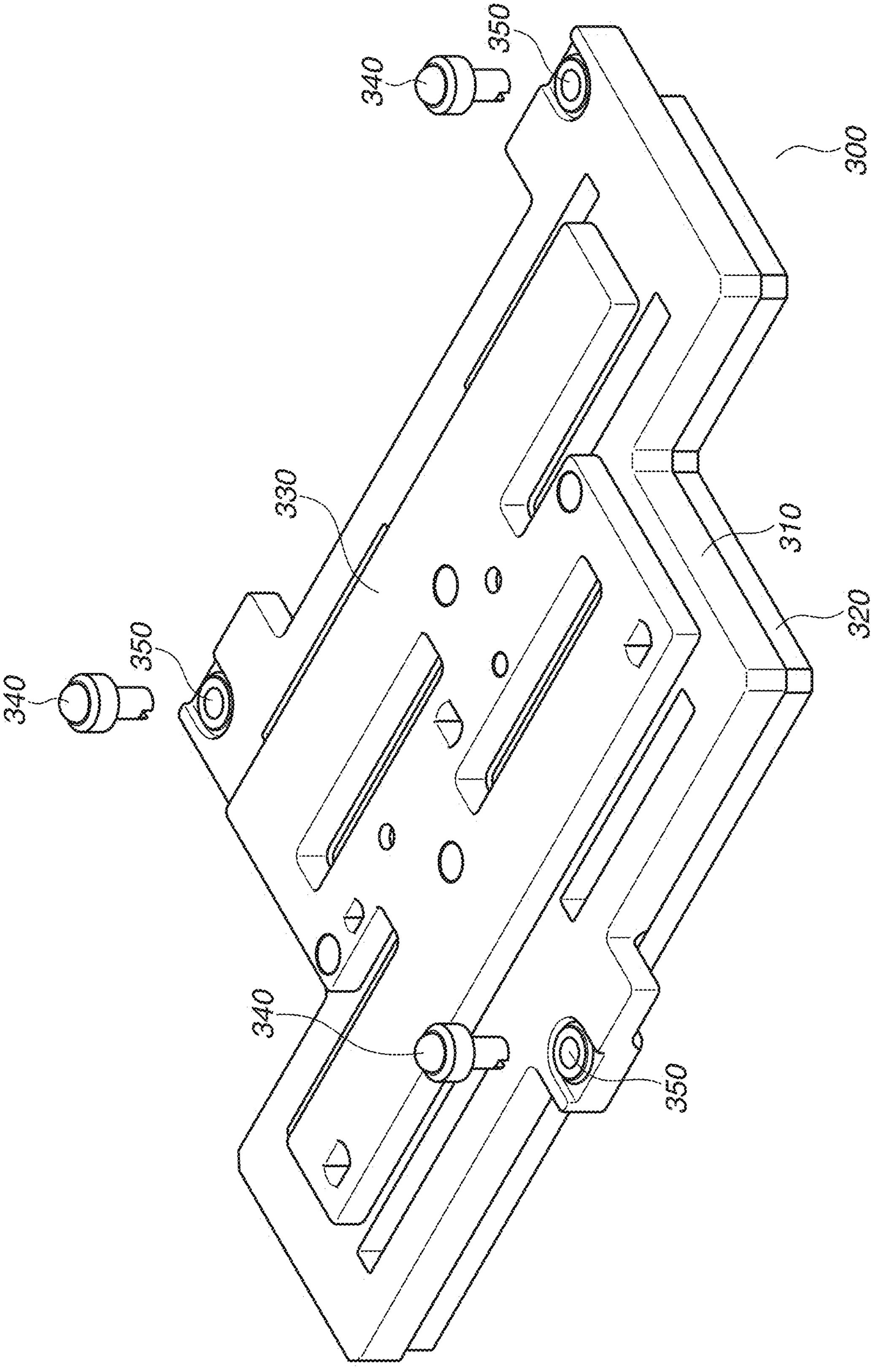
FIG. 10 is a perspective view of a support unit.

FIG. 10 is a perspective view of the support unit 300 for supporting the liquid discharge units 200. The support unit 300 includes the support member 310 to which the liquid discharge units 200 are joined, a frame body member 320 surrounding the liquid discharge units 200, and a liquid supply member 330 in which flow paths for supplying liquid to the liquid discharge units 200 via the support member 310 are formed. Further, the reference members 340 having a function of positioning relative to the recording apparatus 10, and reference fixing members 350 for fixing the reference members 340 to the support member 310. In consideration of thermal expansion influences due to, for example, ink heating temperature adjustments and/or environmental changes, it is desirable to form the support member 310, the frame body member 320, and the liquid supply member 330 with a same member or members with similar linear expansion coefficients. This controls deformation of the entire support unit 300 due to the thermal expansion, and resulting degradation in positional accuracy for each of the recording element substrates 210

Figure 11:
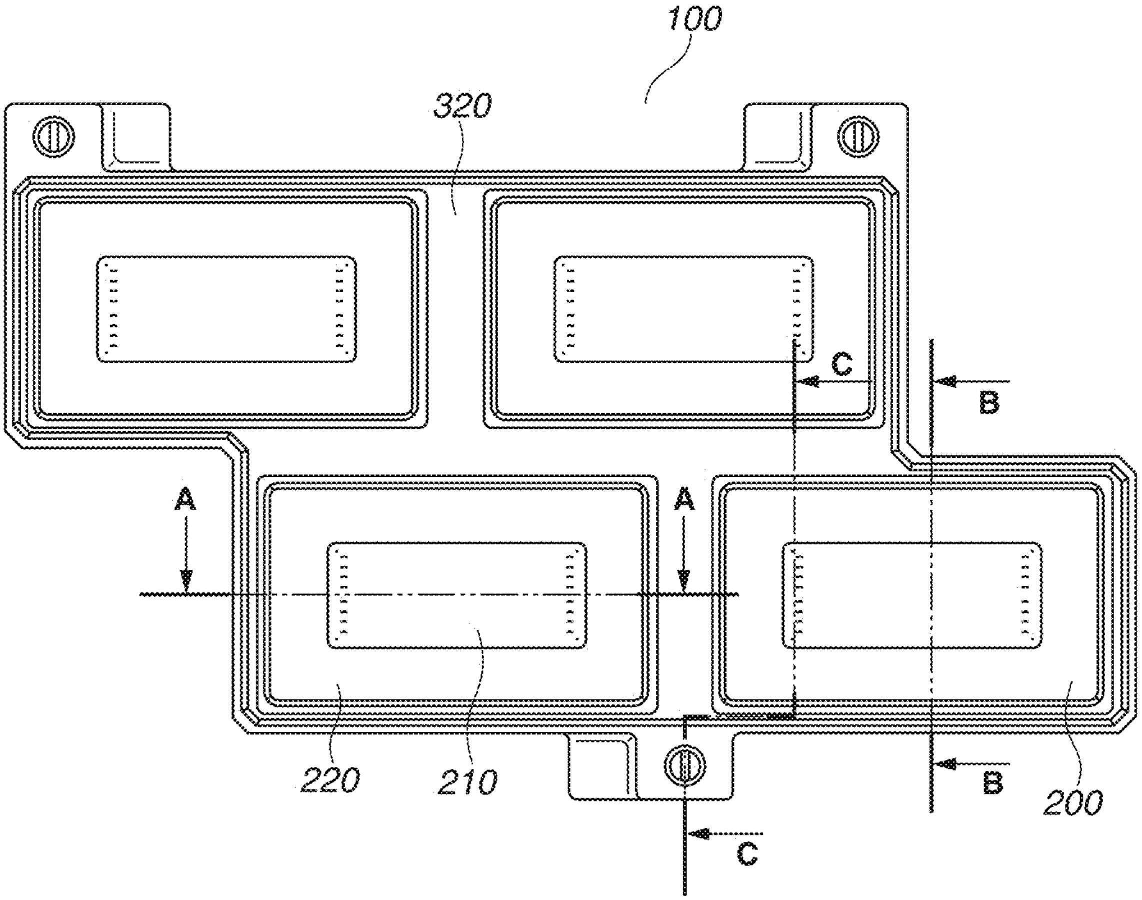
FIG. 11 is a plan view of the liquid discharge head viewed from a surface of the liquid discharge unit.
Figure 12:
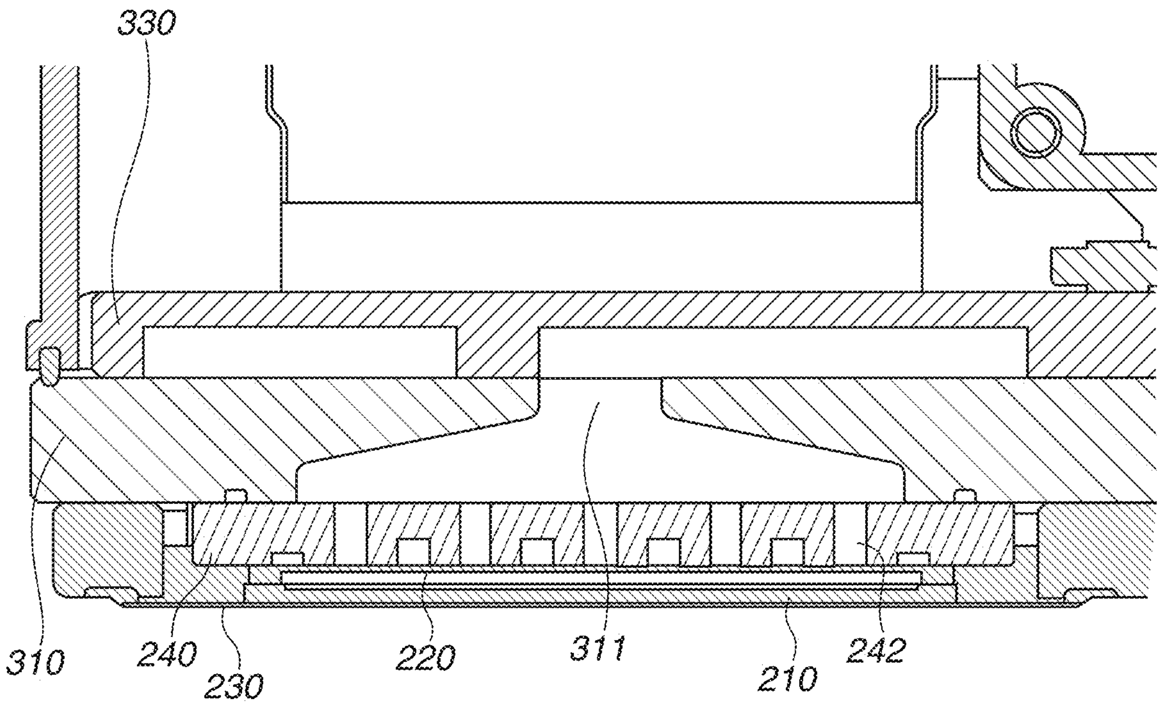
FIG. 12 is an A-A section view of the liquid discharge head.
Figure 13:
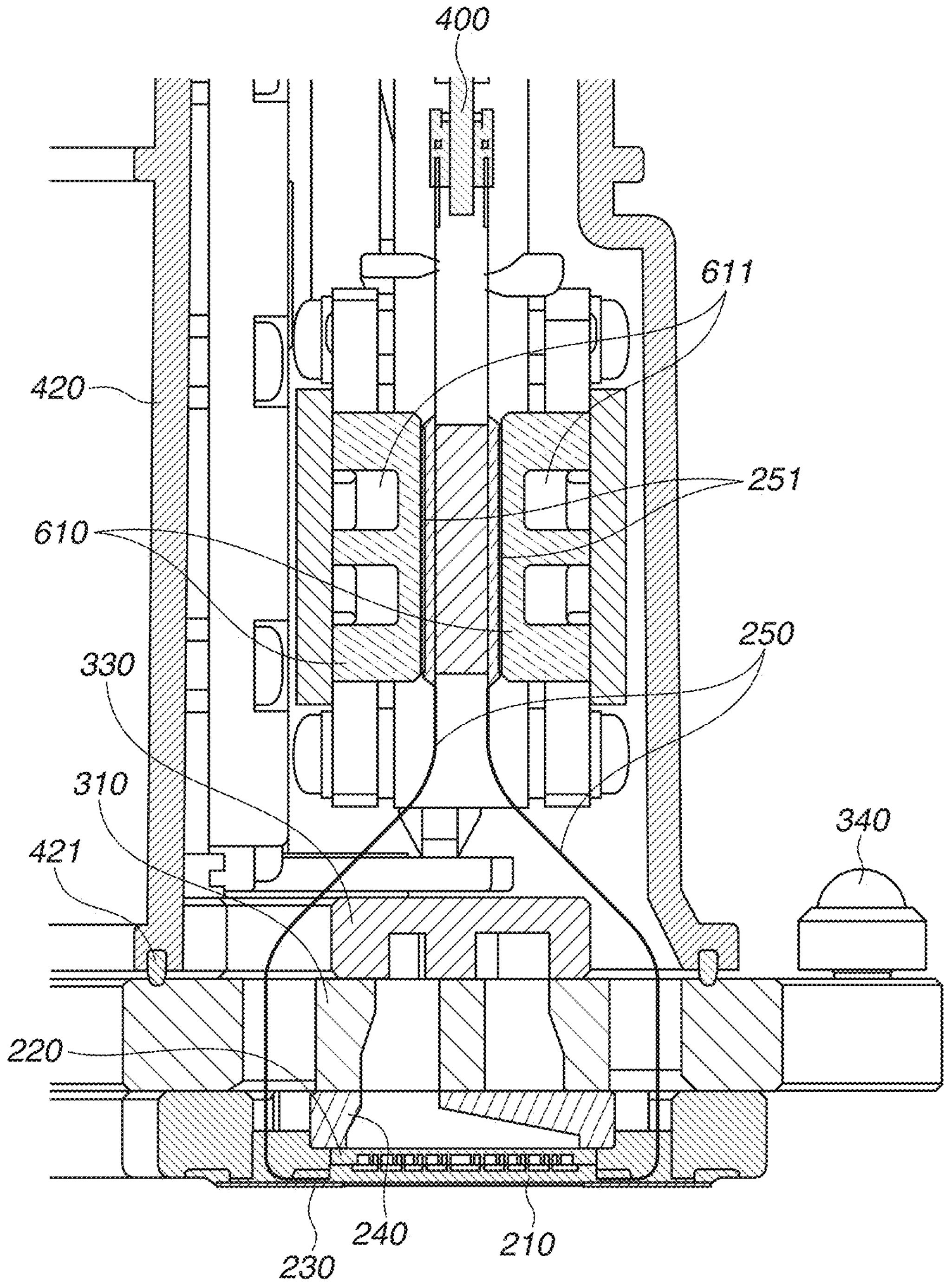
FIG. 13 is a B-B section view of the liquid discharge head.
Figure 14:
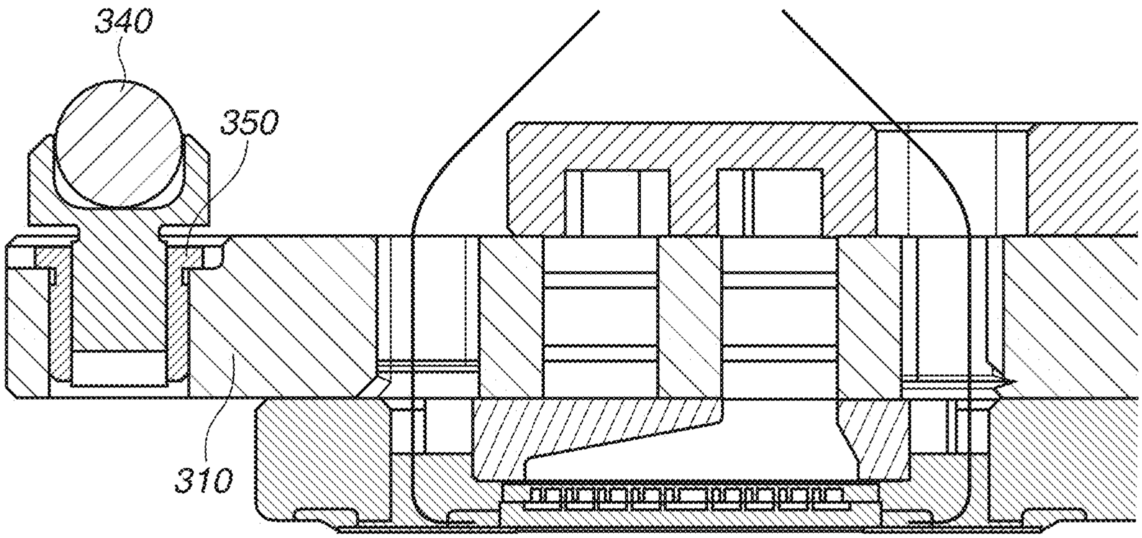
FIG. 14 is a C-C section view of the liquid discharge head.

FIG. 11 is a plan view of the liquid discharge head 100 viewed from a surface of the liquid discharge units 200. FIG. 12 is an A-A section view, FIG. 13 is a B-B section view, and FIG. 14 is a C-C section view, of the liquid discharge head 100 according to the present exemplary embodiment. The flow path member 240 and the liquid supply member 330 are joined to the support member 310, and each liquid flow path is connected in terms of liquid. The support member 310 has three holes into which the reference fixing members 350 are inserted, and the reference fixing members 350 are fixed to the holes, and thus the reference members 340 are fixed to the reference fixing members 350. In addition, the number of the positions fixed by the reference fixing members 350 is not limited thereto. The reference fixing members 350 may be formed integrally with the support member 310. The housing 420 is connected to an upper portion of the support member 310, and includes a sealing member 421 capable of sealing a gap between the housing 420 and the support member 310. This configuration prevents, for example, liquid from dripping from the ink connection portions 501 or the refrigerant connection portions 611 when the liquid discharge head 100 is attached to or detached from the recording apparatus 10, and also prevents liquid from entering inside the liquid discharge head 100 due to the mist occurring when liquid, such as ink, is discharged. As the material of the sealing member 421, elastomer or the like can be desirably used. Examples of the formation method include a method of two-color molding (joining) or bonding, with respect to the housing 420. In a case where the housing 420 and the sealing member 421 are two-color molded (joined), the molding difficulty level of the housing 420 increases, but the number of parts configuring the liquid discharge head 100 and the number of mounting processes can be reduced. In a case where the housing 420 and the sealing member 421 are bonded, the number of parts configuring the liquid discharge head 100 and the number of mounting processes increase, but the sealing member 421 can be easily produced, as compared with the case of the two-color molding.

Figure 15:
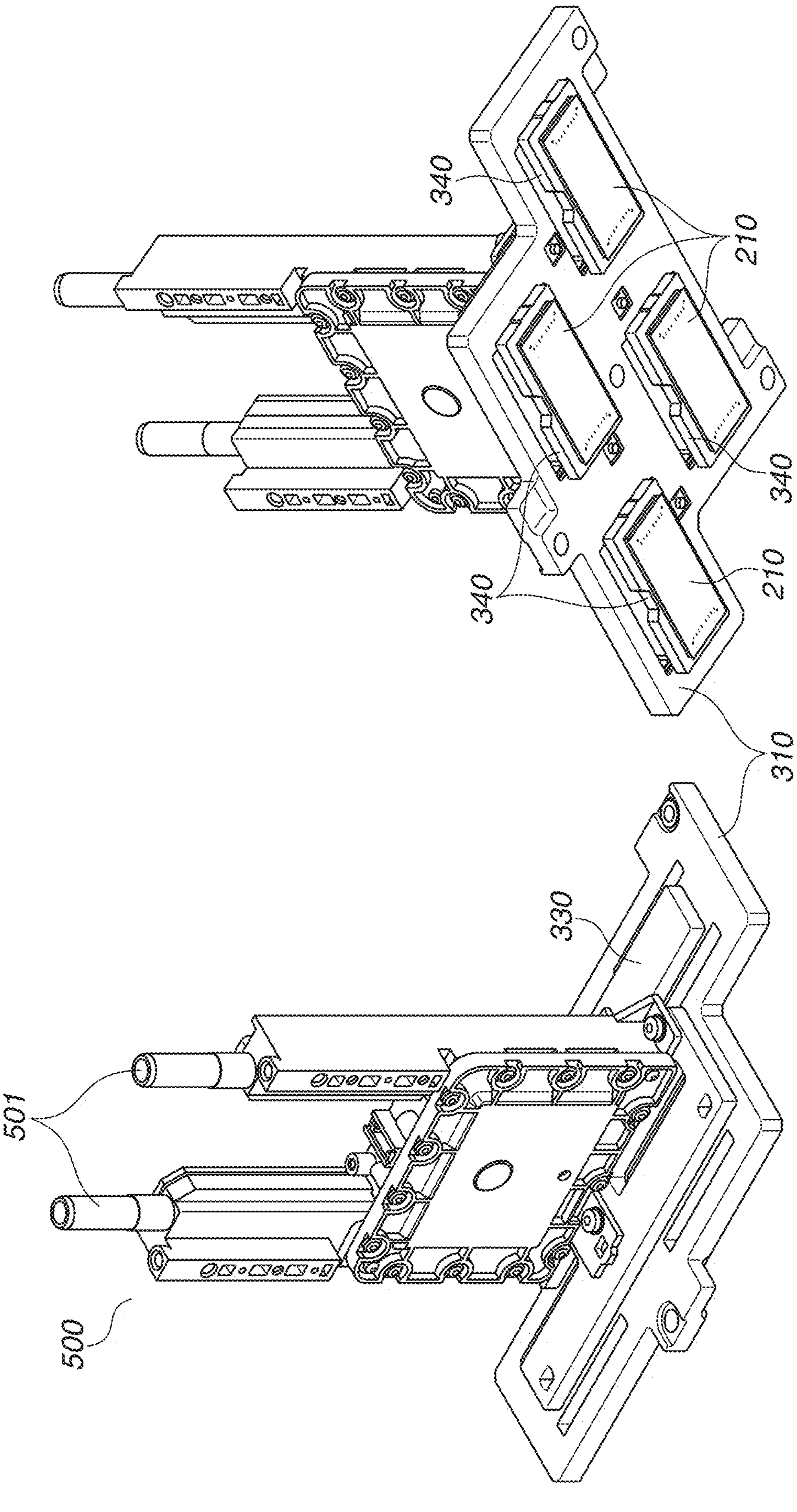
FIG. 15 is a perspective view illustrating a liquid connection configuration of the liquid discharge head.

FIG. 15 is a perspective view illustrating a liquid connection configuration of the liquid discharge head 100 according to the present exemplary embodiment. The liquid supply unit 500 includes the ink connection portions 501, and is connected to the liquid supply system of the recording apparatus 10. This configuration induces liquid to be supplied from the liquid supply system of the recording apparatus 10 to the liquid discharge head 100, and the liquid that has not been discharged from the liquid discharge head 100 is collected to the liquid supply system of the recording apparatus 10. In this way, liquid can be circulated between the recording apparatus 10 and the liquid discharge head 100. Inside the liquid supply unit 500, the filters (not illustrated) that communicate with the openings of the respective ink connection portions 501 may be desirably provided to remove foreign substances in the supplied ink.

Figure 16:
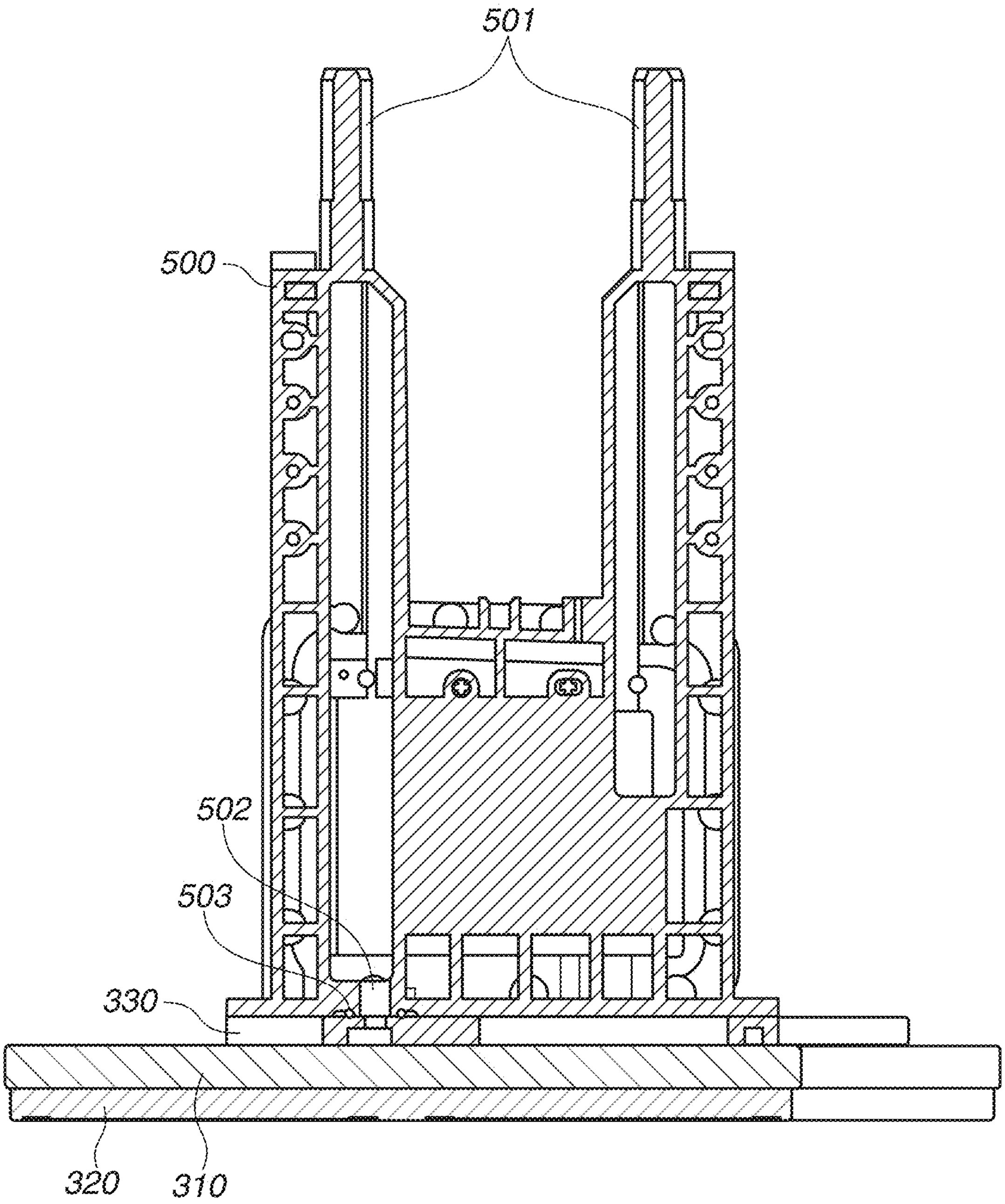
FIG. 16 is a section view of a liquid connection portion between a liquid supply unit and a liquid supply member.

FIG. 16 is a section view of a liquid connection portion between the liquid supply unit 500 and the liquid supply member 330. The liquid having flowed into the liquid discharge head 100 from the recording apparatus 10 through the ink connection portions 501 is supplied to the liquid supply member 330 after passing through communication ports 502. A gap between the liquid supply unit 500 and the liquid supply member 330 is sealed by an elastic member 503.

Figure 17:
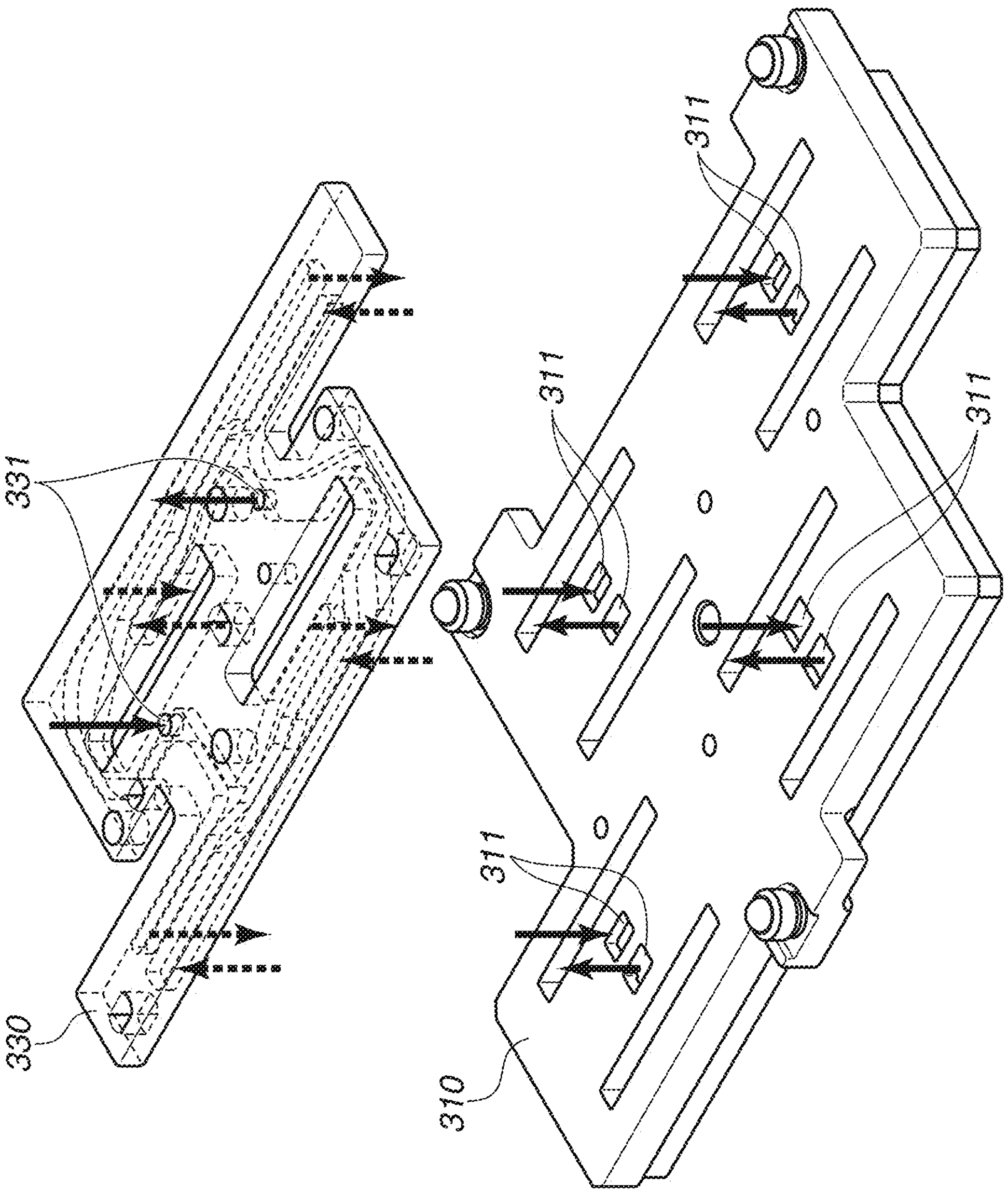
FIG. 17 is a perspective view illustrating a liquid connection configuration of the support unit.
Figure 18:
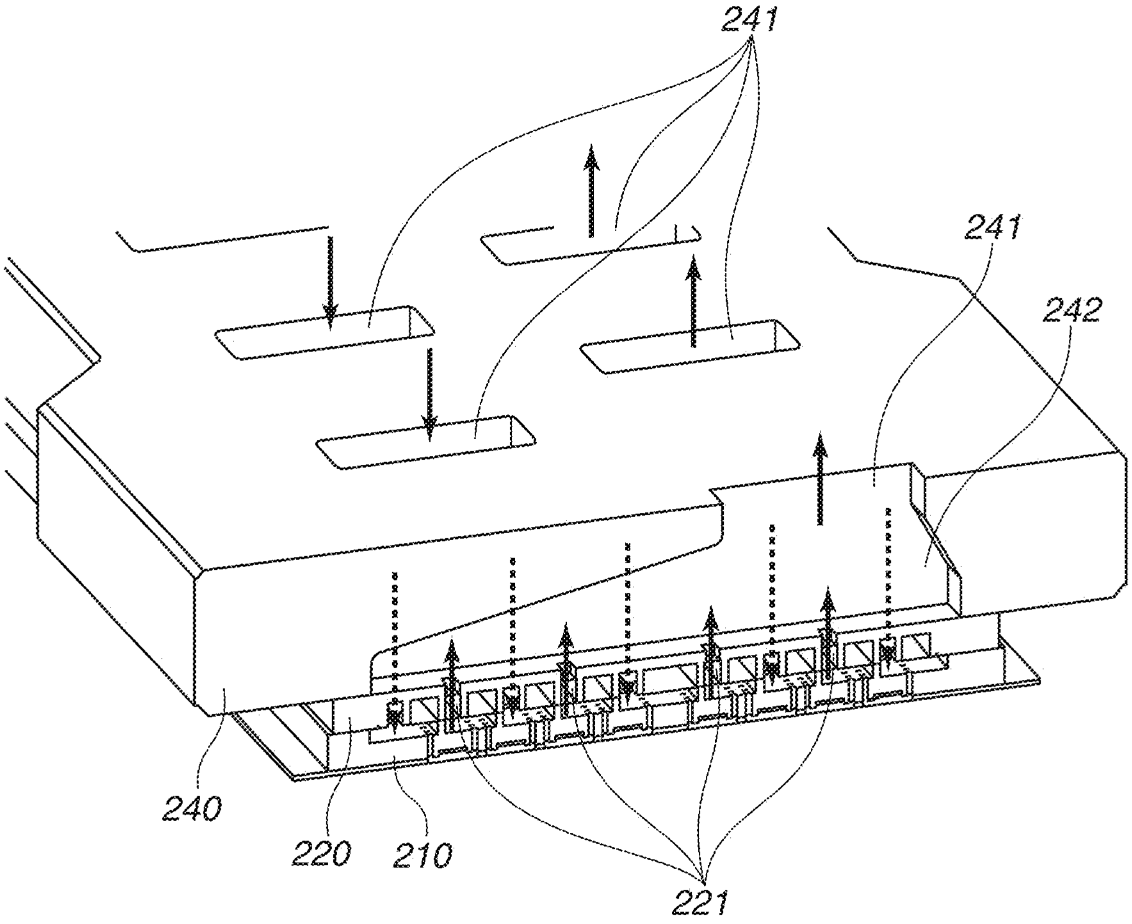
FIG. 18 is a section view of a flow path of the liquid discharge unit.

FIG. 17 is a perspective view illustrating a liquid connection configuration of the support unit 300, and FIG. 18 is a section view illustrating the flow paths of the liquid discharge unit 200. The liquid supply unit 500 and the liquid supply member 330 are connected through communication ports 331 in terms of liquid. Inside the liquid supply member 330, flow paths for supplying liquid to each of the liquid discharge units 200 are formed. The liquid supply member 330 and the support member 310 are connected through communication ports 311 in terms of liquid. The support member 310 and the liquid discharge units 200 are connected through communication ports 241 of the flow path member 240 in terms of liquid. The liquid flow paths 242 are formed in the flow path member 240, and are connected to the recording element substrate flow path member 220 via communication ports 221 in terms of liquid.

Figure 19:
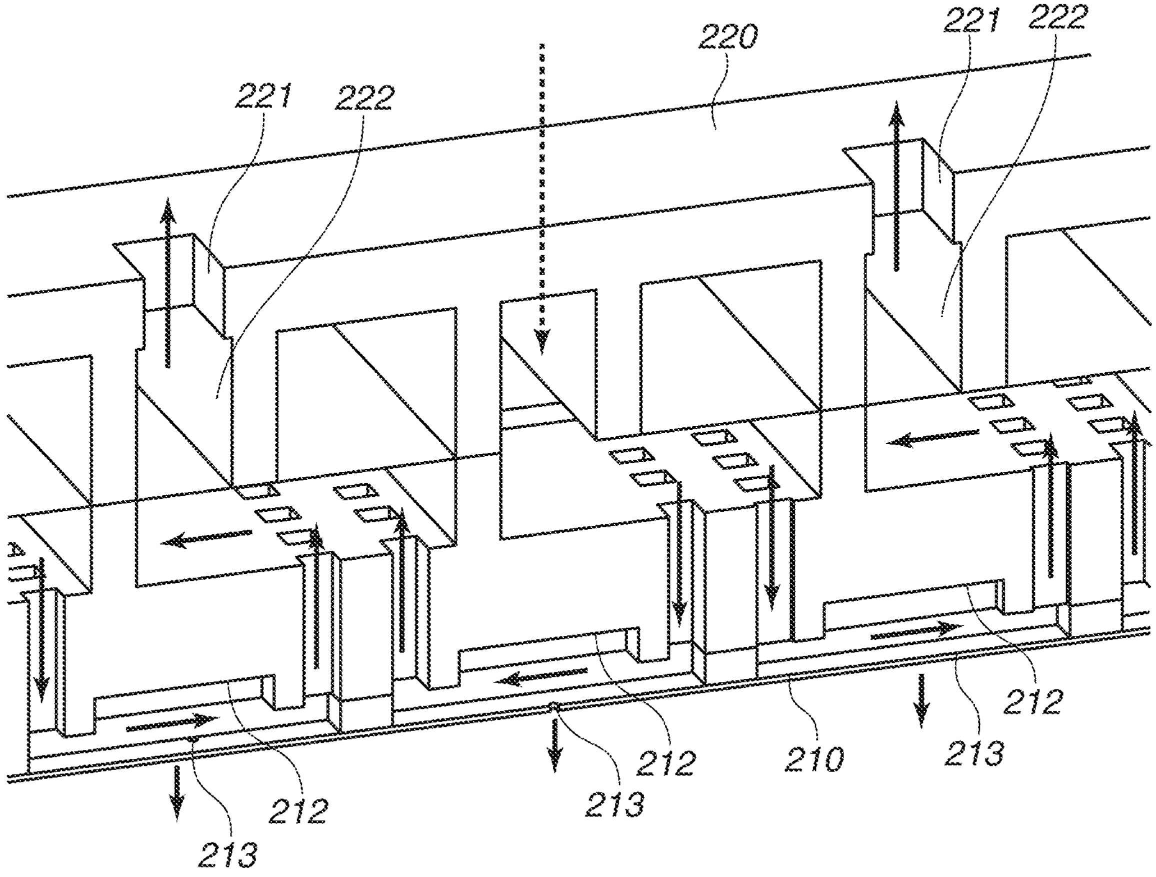
FIG. 19 is a section view of flow paths in a recording element substrate.

FIG. 19 is a section view illustrating flow paths in the recording element substrate 210. The liquid having flowed into through the communication ports 221 is supplied to the recording element substrate 210 after passing through common flow paths 222. The liquid discharge unit 200 (recording element substrate 210) includes piezoelectric elements 262 (not illustrated) driven by applying voltage, and the liquid is discharged from discharge ports 213 with pressure generated by driving of the piezoelectric elements 262. The liquid that has not been discharged through the discharge ports 213 in the liquid discharge head 100 according to the present exemplary embodiment is collected by the recording apparatus 10 through the common flow paths 222 and the communication ports 221, as described above.

Figure 20:
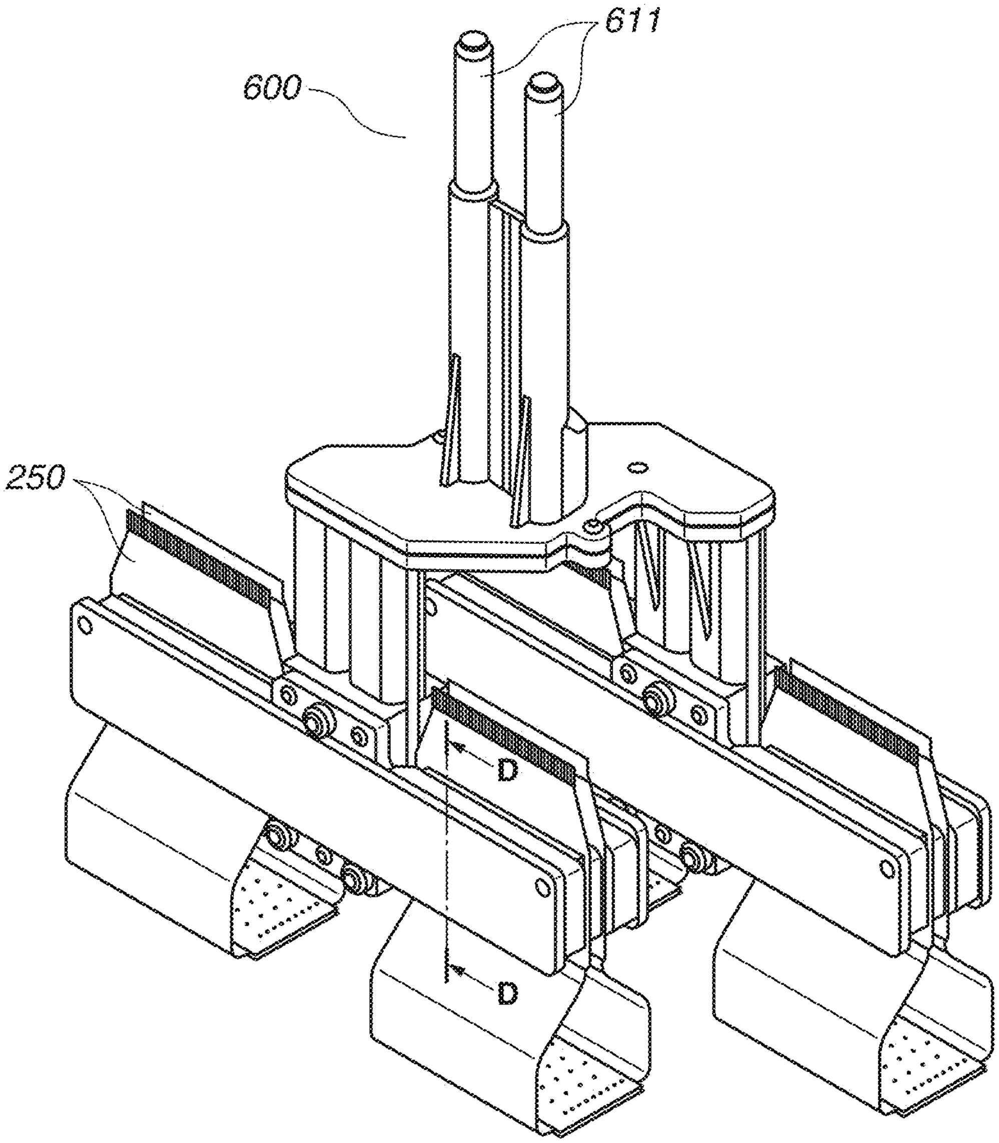
FIG. 20 is a perspective view of a cooling unit.
Figure 21:
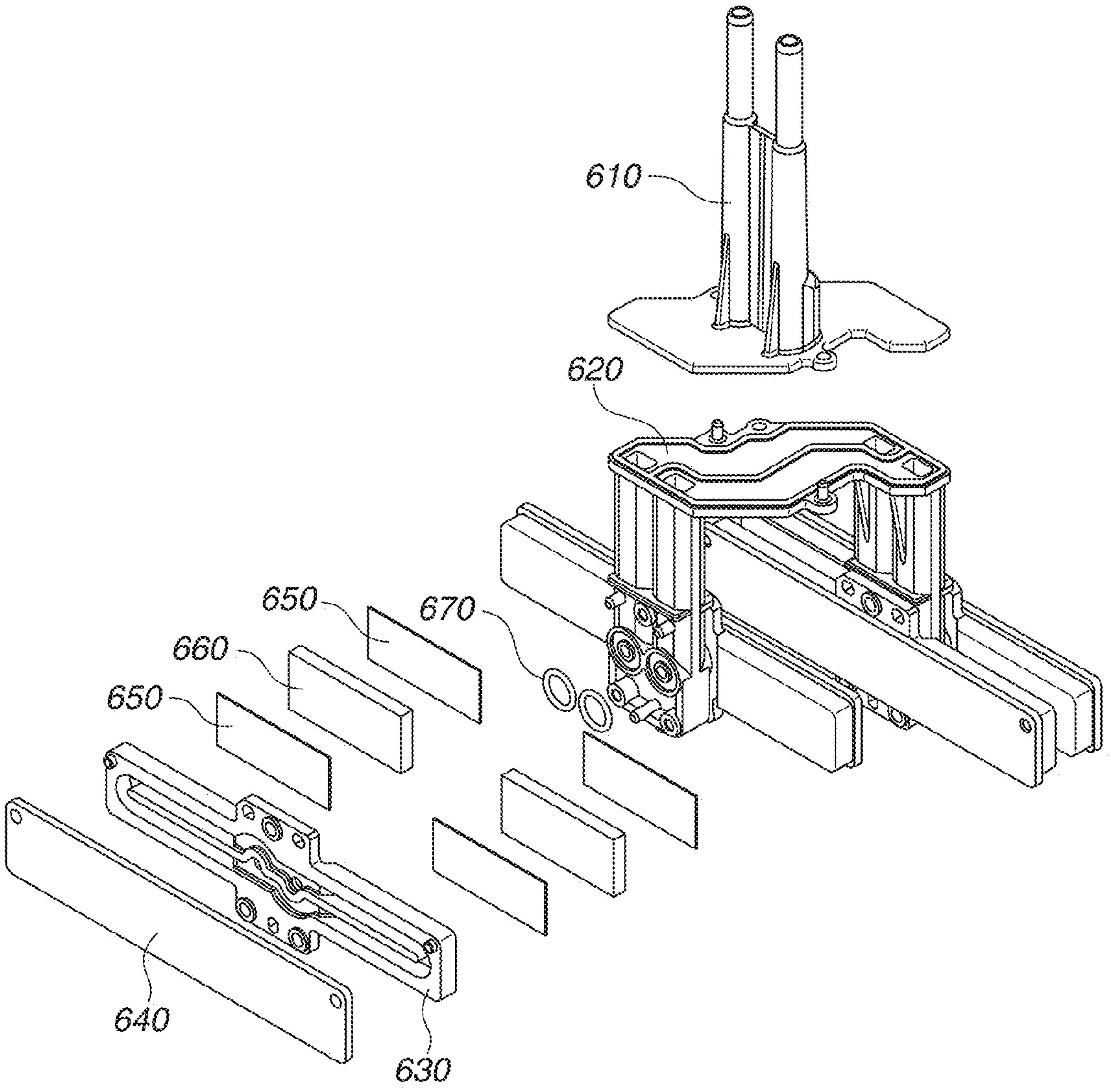
FIG. 21 is an exploded perspective view of the cooling unit.
Figure 22:
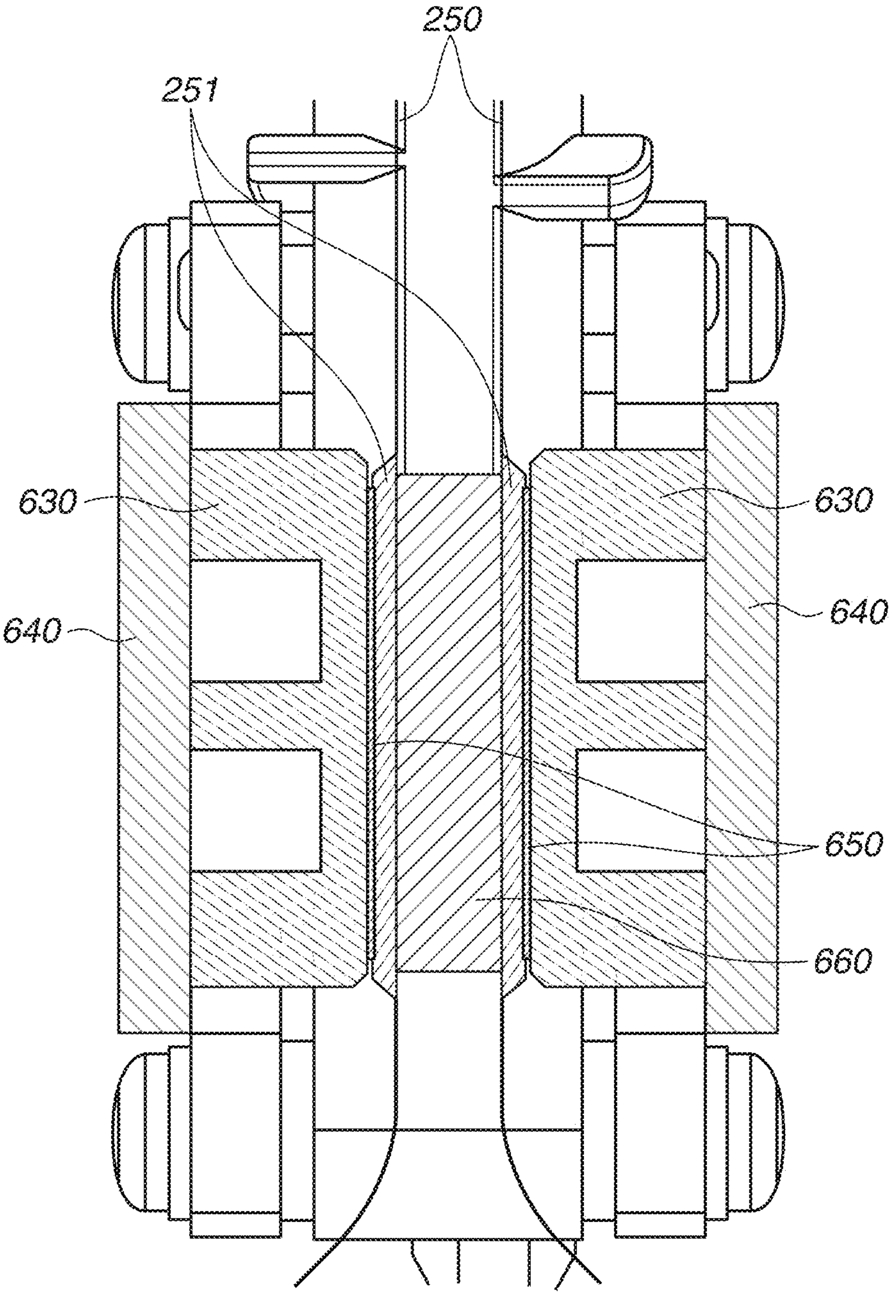
FIG. 22 is a D-D section view of the cooling unit.

FIG. 20 is a perspective view of the cooling unit 600 for cooling the drive circuit substrates 251, FIG. 21 is an exploded perspective view of the cooling unit 600, and FIG. 22 is a D-D section view of the cooling unit 600. The cooling unit 600 includes the refrigerant connection portions 611, and is connected to a refrigerant supply system of the recording apparatus 10. With this configuration, refrigerant is supplied to the cooling unit 600 from the refrigerant supply system of the recording apparatus 10, and the refrigerant that has passed through the cooling unit 600 is collected by the refrigerant supply system of the recording apparatus 10. Thus, the refrigerant can be circulated between the recording apparatus 10 and the cooling unit 600. The refrigerant that has flowed in from the refrigerant connection portions 611 is branched by the refrigerant flow paths formed between a first refrigerant supply member 610 and a second refrigerant supply member 620. The second refrigerant supply member 620 and a first cooling member 630 are connected in terms of liquid via seal members 670. The refrigerant branched in the second refrigerant supply member 620 circulates in a refrigerant flow path formed between the first cooling member 630 and a second cooling member 640, and flows out again into the second refrigerant supply member 620. The first cooling member 630 is brought into contact with the drive circuit substrates 251 across heat transfer members 650 to transfer heat generated when the drive circuit substrates 251 operate to the refrigerant in the first cooling member 630. Elastic members 660 are provided between the two flexible wiring substrates 250, so that the heat transfer members 650 are surely brought into close contact with the drive circuit substrates 251. The first cooling member 630 is desirably made of a member with a high thermal conductivity, such as aluminum, to easily transfer the heat generated in the drive circuit substrates 251.

Next, the electrical connection portion cover member 430, which is a characterizing portion of the present disclosure, will be described.

Figure 24:
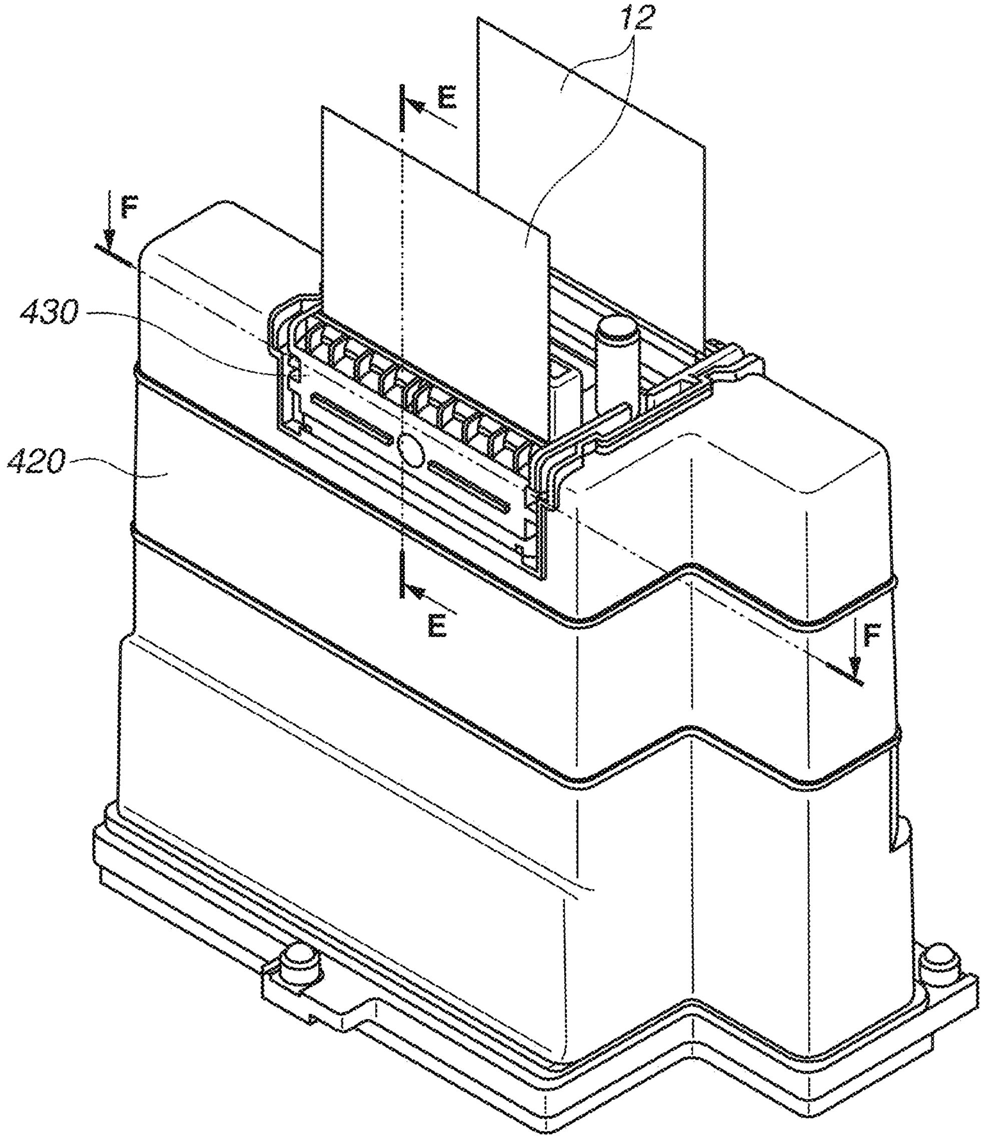
FIG. 24 is a perspective view of the liquid discharge head with the electrical wiring substrates connected.
Figure 25:
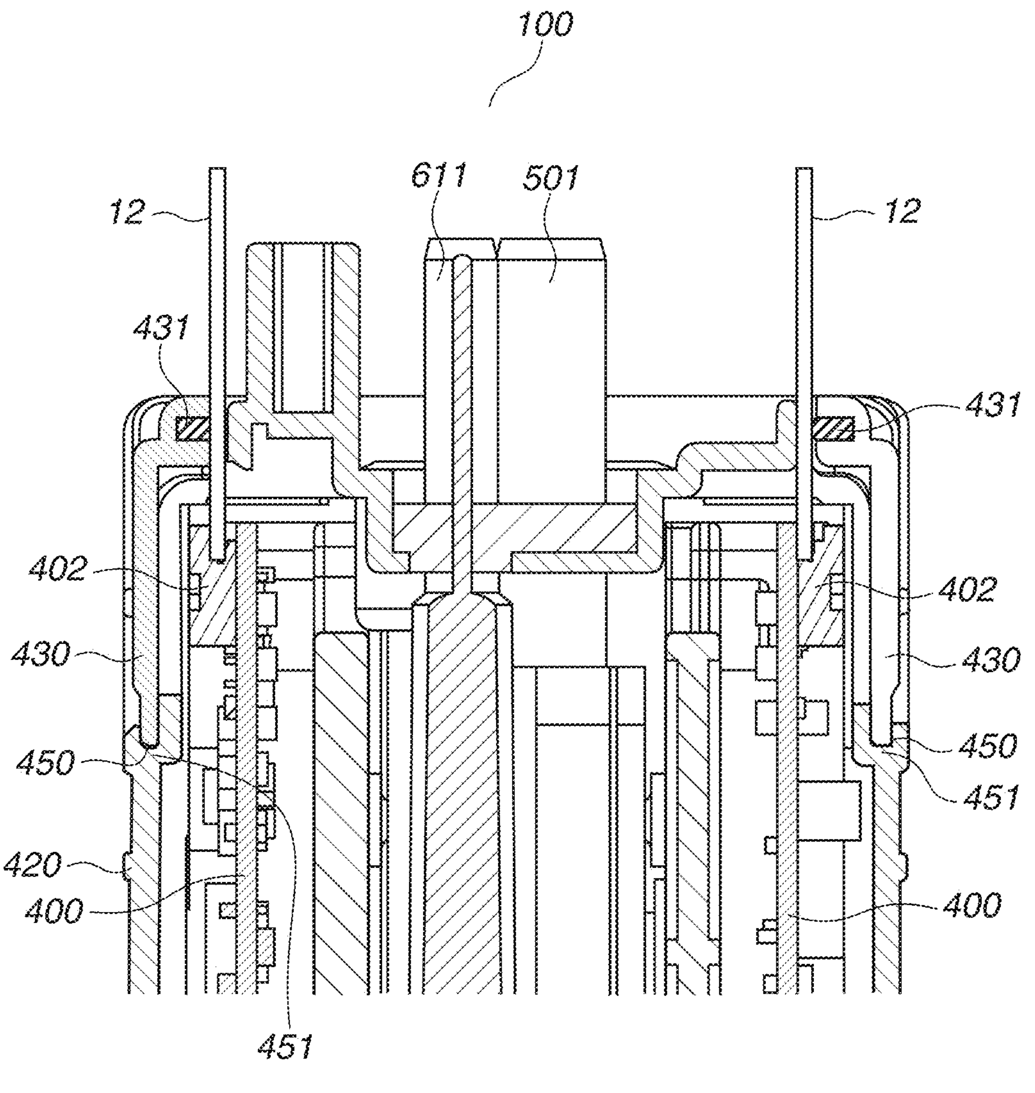
FIG. 25 is an E-E section view of the liquid discharge head with the electrical wiring substrates connected.

FIGS. 23A and 23B are section views illustrating an electrical connection portion between the recording apparatus 10 and the liquid discharge head 100. FIG. 23A illustrates a state where the liquid discharge head 100 and the electrical wiring substrates 12 of the recording apparatus 10 are not connected, and FIG. 23B illustrates a state immediately before the liquid discharge head 100 and one of the electrical wiring substrates 12 of the recording apparatus 10 are connected. FIG. 24 is a perspective view of the liquid discharge head 100 to which the electrical wiring substrates 12 are connected, and FIG. 25 is an E-E section view of the liquid discharge head 100 to which the electrical wiring substrates 12 are connected, cut along an E-E line in FIG. 24.

The liquid discharge head 100 according to the present exemplary embodiment includes the electrical connection portion cover members 430 covering the electrical connection portions 402. As described above, the ink connection portions 501 and the refrigerant connection portions 611 are provided at a substantially center position of the upper end portion of the liquid discharge head 100, and the ink connection portions 501 and the refrigerant connection portions 611 are respectively connected to ink supply portions and refrigerant supply portions of the recording apparatus 10. Liquids, such as ink and refrigerant, are supplied into the liquid discharge head 100. In the liquid discharge head 100 according to the present exemplary embodiment, the two electrical connection portions 402 and the two electrical connection portion cover members 430 are provided for the single liquid discharge head 100, and arranged to face each other with the ink supply portions and the refrigerant supply portions sandwiched therebetween. The connection direction of the electrical connection portions 402 and the electrical wiring substrates 12 is substantially the same as that of the ink connection portions 501 and the refrigerant connection portions 611, and that of the ink supply portions and the refrigerant supply portions of the recording apparatus 10, and is a substantially vertical direction in a use state of the liquid discharge head 100. Here, the use state of the liquid discharge head 100 indicates an arrangement state of the liquid discharge head 100 in a state where the recording apparatus 10 can normally record images and characters.

The electrical connection portion cover members 430 cover the electrical connection portions 402 so that liquid is prevented from dripping from the liquid connection portions when the liquid discharge head 100 is attached to or detached from the recording apparatus 10, and that liquid is prevented from entering the electrical connection portions 402 due to the mist occurring when the liquid, such as ink, is discharged. The housing 420 has recessed portions 451 into which the respective electrical connection portion cover members 430 are inserted. The electrical connection portion cover members 430 have insertion portions 450 that are insertable into the recessed portions 451. The electrical connection portion cover member 430 is inserted into the housing 420 in a thick arrow direction toward the insertion portion 450 in FIG. 23B. Rotating the electrical connection portion cover member 430 with the insertion portion 450 as a center enables the electrical connection portion cover member 430 to be attached to the housing 420. This configuration enables the electrical connection portion cover members 430 to protect the electrical connection portions 402. Inserting the insertion portion 450 into the recessed portion 451 leads to an increase in an engaging force (joining force) between the electrical connection portion cover member 430 and the housing 420, as compared with the case where the electrical connection portion cover member 430 is not inserted into any member as in techniques discussed in Japanese Patent Application Laid-open No. 2014004767. Thus, the electrical connection portion cover member 430 is prevented from dropping off from the housing 420 even with an unintentional external force applied to the electrical connection portion cover member 430. In addition, such a configuration results in the recessed portion 451 covering the insertion portion 450, so that the electrical connection portion cover member 430 is prevented from unintentionally dropping off from the housing 420 even if an object touches the insertion portion 450 by mistake, or the liquid discharge head 100 vibrates. In other words, the foregoing configuration reduces the possibility of the electrical connection portion cover members 430 unintentionally dropping off from the housing 420 of the liquid discharge head 100, while preventing the liquid from entering the electrical connection portions 402 of the liquid discharge head 100.

FIG. 24 is a perspective view illustrating a state where the electrical wiring substrates 12 are connected, in other words, the liquid discharge head 100 is in use state. FIG. 25 is an E-E section view cut along an E-E line in FIG. 24. In the use state of the liquid discharge head 100, the electrical wiring substrates 12 protrude from the electrical connection portion cover members 430. In other words, at least a part of each of the electrical connection portion cover members 430 contacts the electrical wiring substrate 12. In addition, it is desirable that the electrical connection portion cover members 430 contact the electrical wiring substrates 12 at positions opposing the positions at which the insertion portions 450 are formed.

Figure 26:
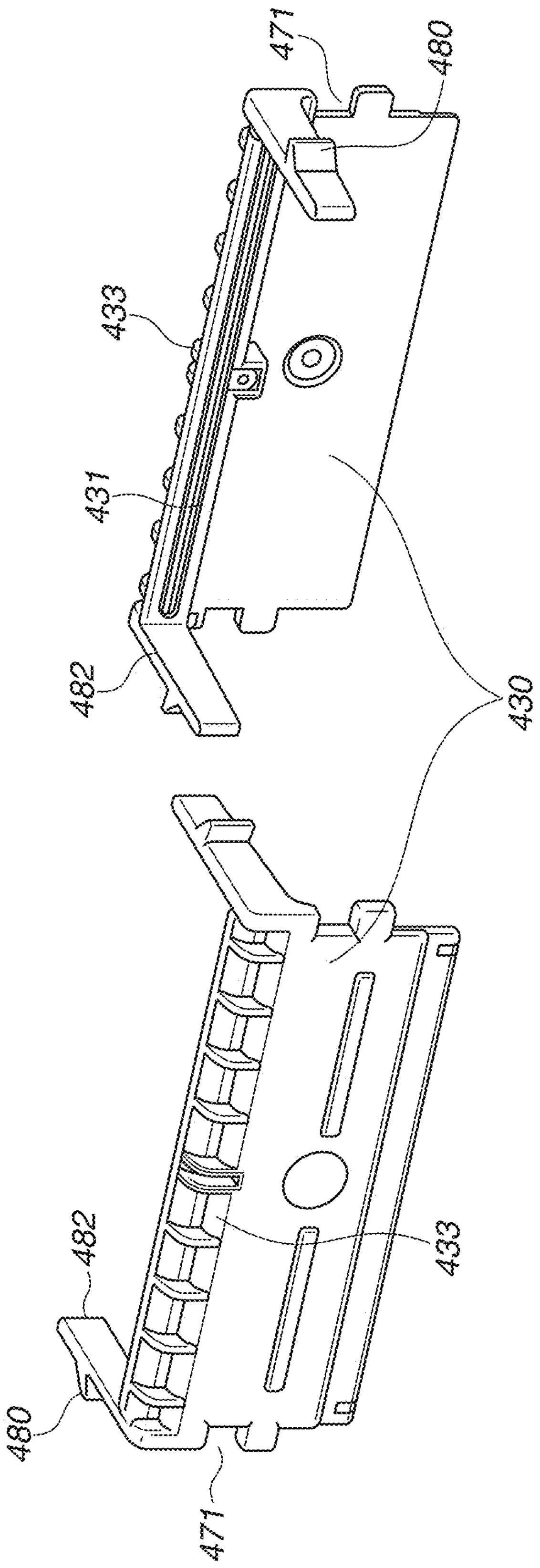
FIG. 26 is a perspective view of electrical connection portion cover members.

Each of the electrical connection portion cover members 430 includes a first elastic member 431 as illustrated in FIG. 26, and each of the electrical connection portion cover members 430 and the electrical wiring substrate 12 are desirably brought into contact via the respective first elastic members 431. This configuration improves sealability between the electrical connection portion cover members 430 and the electrical wiring substrates 12, thus further effectively preventing liquid from entering the electrical connection portions 402. In addition, it is desirable that the first elastic member 431 is joined or bonded to the electrical connection portion cover member 430, but the electrical connection portion cover member 430 itself may be formed with an elastic member.

The electrical wiring substrate 12 may desirably be a flexible wiring substrate. The electrical wiring substrate 12 formed with an elastic member, such as a flexible wiring substrate, improves the sealability between the electrical connection portion cover member 430 and the electrical wiring substrate 12, thus further effectively preventing liquid from entering the electrical connection portions 402.

As illustrated in FIG. 26, it is desirable that each of the electrical connection portion cover members 430 includes a rib portion 433 on the back side of the surface on which the first elastic member 431 is provided. This configuration prevents degradation in the sealability of the electrical connection portion cover member 430 resulting from the reaction force of the first elastic member 431 generated when the electrical connection portion cover member 430 is brought into contact with the electrical wiring substrate 12 via the first elastic member 431. Thus, it is possible to further effectively prevent the liquid from entering the electrical connection portions 402.

Elastomer or the like can be suitably used as a material of the first elastic members 431. Examples of the production method therefor include a method of two-color molding (joining) or bonding with respect to the electrical connection portion cover members 430. In a case of the two-color molding (joining), the molding difficulty level of the electrical connection portion cover members 430 increases, but the number of parts configuring the liquid discharge head 100 and the number of mounting processes can be reduced. In a case of bonding, the number of parts configuring the liquid discharge head 100 and the number of mounting processes increase, but the first elastic members 431 can be easily produced, as compared with the case of two-color molding.

Figure 27:
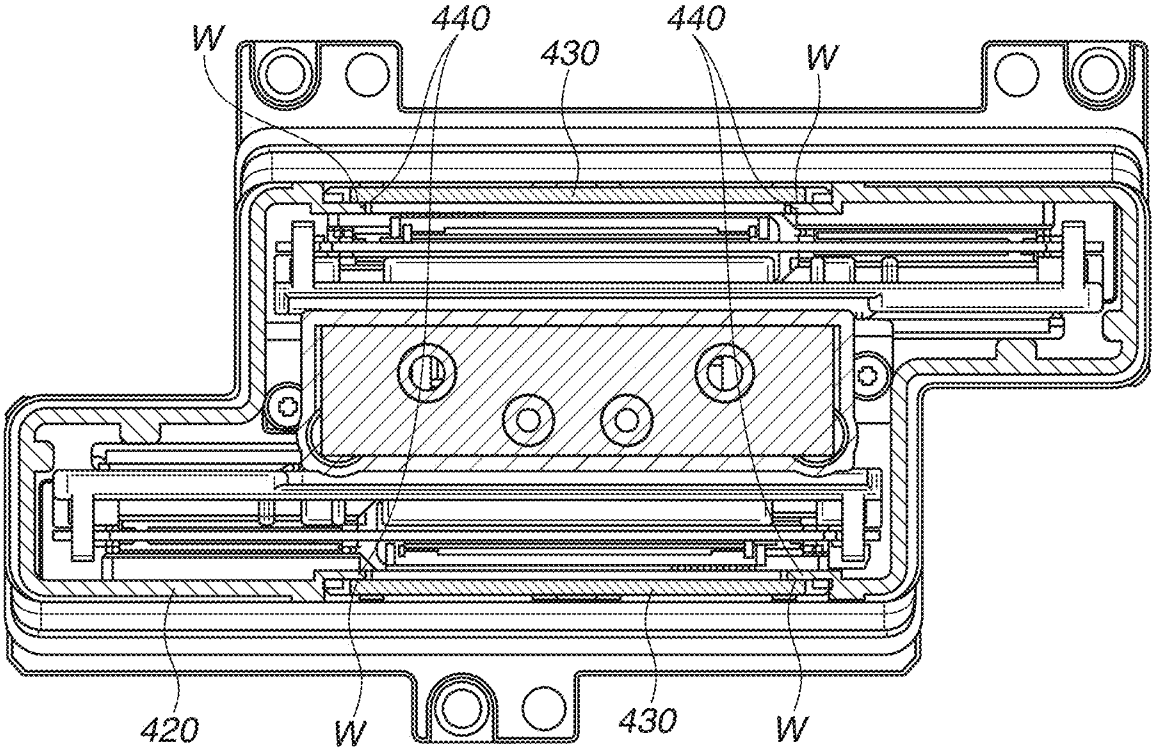
FIG. 27 is an F-F section view of the liquid discharge head.

FIG. 27 is an F-F section view of the liquid discharge head 100 cut along an F-F line in FIG. 24. The housing 420 includes opening portions 440 for accommodating the electrical connection portions 402. The electrical connection portion cover members 430 cover the electrical connection portions 402 by covering the opening portions 440. In this case, in a state where the insertion portions 450 are inserted in the recessed portions 451, it is desirable that at least one side of each of the electrical connection portion cover members 430 contacts the opening portions 440. This configuration reduces the gap between the electrical connection portion cover members 430 and the opening portions 440. In other words, such a configuration prevents liquid from entering the electrical connection portions 402.

Further, it is more desirable that at least three sides of each of the electrical connection portion cover members 430 contact the opening portions 440. In the present exemplary embodiment, three sides, other than the side at which each of the electrical connection portion cover members 430 contacts the electrical wiring substrate 12 via the first elastic member 431, of each of the electrical connection portion cover members 430, contact the opening portions 440. This configuration reduces the gap between each of the electrical connection portion cover members 430 and the opening portions 440. It is desirable that a width W (see FIG. 27) at which each of the electrical connection portion cover members 430 contacts the opening portions 440 is 1 mm or more. In a case where the width W is too small, the effect of preventing liquid from entering the electrical connection portions 402 may deteriorate.

Further, it is preferable that each of the electrical connection portion cover members 430 and the opening portions 440 contact each other via a second elastic member (not illustrated). This configuration increases the sealability between the electrical connection portion cover members 430 and the opening portions 440, thus further effectively preventing liquid from entering the electrical connection portions 402. In addition, the second elastic member may be included in either of the electrical connection portion cover members 430 or the housing 420 (opening portions 440). The material and the production method for the second elastic member are similar to those of the first elastic members 431.

Figure 28:
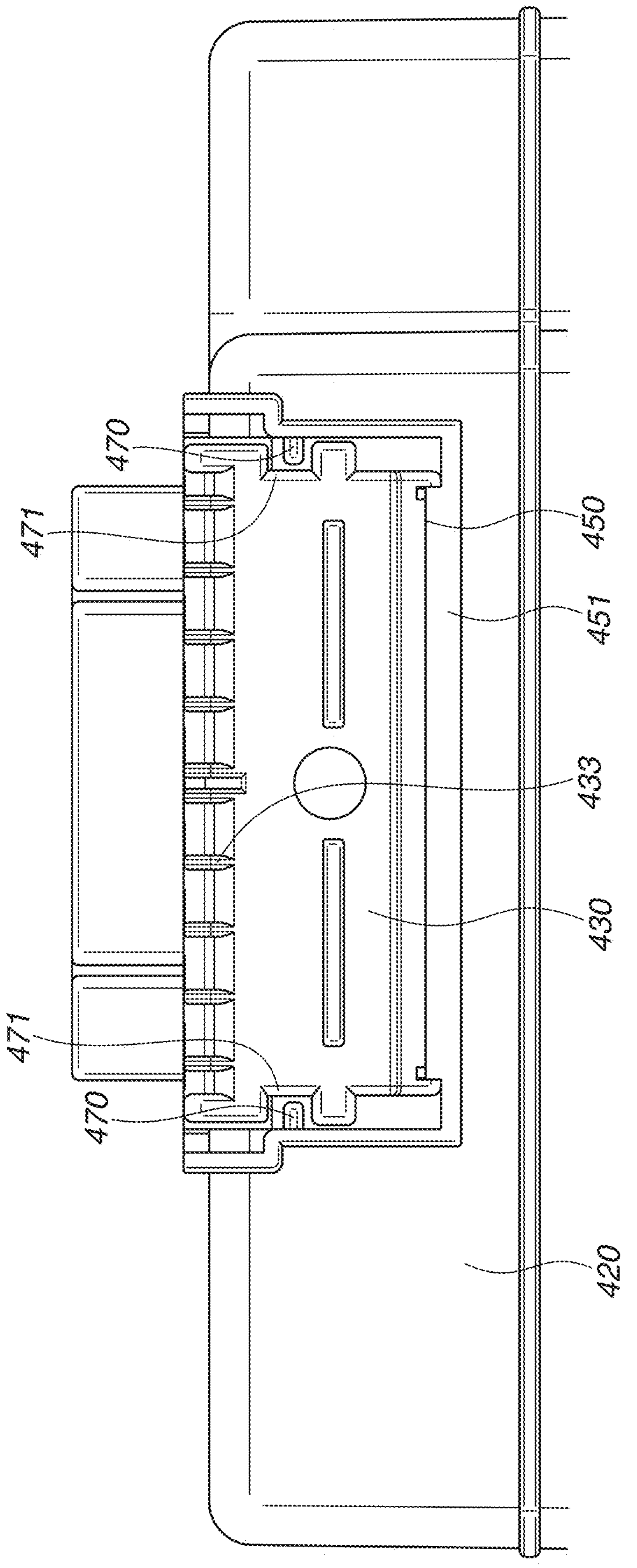
FIG. 28 is a front view of the liquid discharge head illustrating an area around the electrical connection portion cover member.

FIG. 28 is a front view of the liquid discharge head 100 illustrating an area around the electrical connection portion cover member 430. It is desirable that the housing 420 has first protruding portions 470, and the electrical connection portion cover member 430 has first fitting portions 471 into which the first protruding portions 470 fit. This configuration further effectively prevents the electrical connection portion cover member 430 from unintentionally dropping off from the housing 420 due to an external force or the like. In addition, it is desirable that the first fitting portions 471 are disposed at positions in the electrical connection portion cover member 430 on a side on which the insertion portion 450 is not present and that does not contact the electrical wiring substrate 12 via the first elastic member 431. It is also desirable that the housing 420 has the first protruding portions 470 at positions on a side of the housing 420 not including the recessed portion 451.

Figure 29:
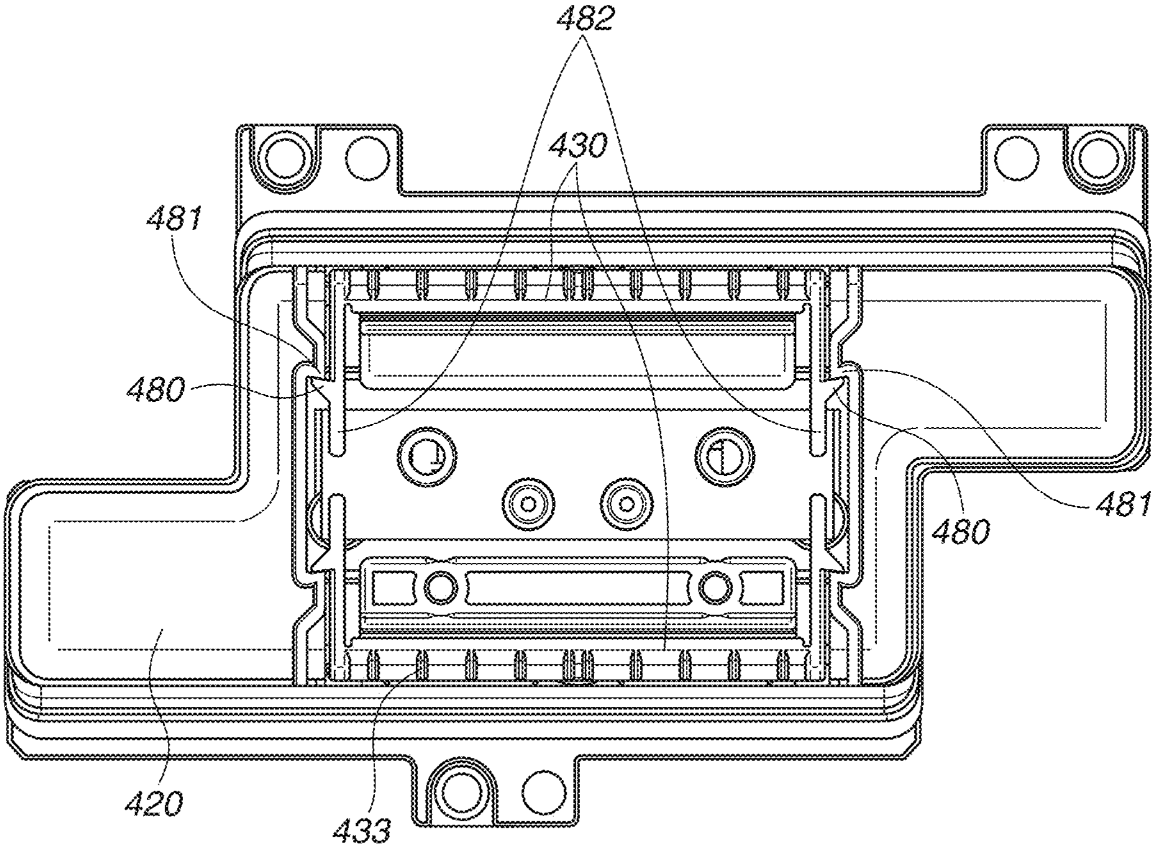
FIG. 29 is a top view of the liquid discharge head.

FIG. 29 is a top view of the liquid discharge head 100. It is desirable that each of the electrical connection portion cover members 430 has second protruding portions 480, and the housing 420 has second fitting portions 481 into which the second protruding portions 480 fit. This configuration further effectively prevents liquid from entering the electrical connection portions 402. Further, it is desirable that each of the electrical connection portion cover members 430 includes lever members 482 extending in a direction to cover the housing 420, and the second protruding portion 480 is formed on each of the lever members 482. This configuration enables the second protruding portions 480 to fit into the second fitting portions 481, thus firmly attaching the electrical connection portion cover member 430 to the housing 420. Thus, it is possible to further reduce the possibility of the electrical connection portion cover members 430 unintentionally dropping off from the housing 420 of the liquid discharge head 100. Deforming the lever members 482 inward releases the second protruding portions 480 from a state of fitting into the second fitting portions 481, so that the electrical connection portion cover member 430 can be easily detached from the housing 420. In other words, it is possible to easily detach the electrical connection portion cover member 430 when the liquid discharge head 100 is attached or detached, while preventing the electrical connection portion cover member 430 from unintentionally dropping off from the housing 420.

As described above, in the liquid discharge head 100 according to the present exemplary embodiment, the insertion portion 450 of each of the electrical connection portion cover members 430 is inserted into (covered by) the recessed portion 45 so that liquid is prevented from entering the electrical connection portions 402 and the possibility of the electrical connection portion cover members 430 unintentionally dropping off from the housing 420 is reduced.

When the present disclosure is summed up, the present disclosure includes the following configurations.

Configuration 1

A liquid discharge head comprising a liquid discharge unit configured to discharge liquid; a housing configured to cover the liquid discharge unit; an electrical connection portion configured to be electrically connected to an electrical wiring substrate of a recording apparatus; and an electrical connection portion cover member configured to cover the electrical connection portion, wherein power is supplied from the recording apparatus to the liquid discharge unit via the electrical connection portion, wherein the housing includes a recessed portion into which the electrical connection portion cover member is to be inserted, wherein the electrical connection portion cover member includes an insertion portion insertable into the recessed portion, and wherein the insertion portion is covered by the recessed portion.

Configuration 2

The liquid discharge head according to Configuration 1, wherein at least a part of the electrical connection portion cover member contacts the electrical wiring substrate.

Configuration 3

The liquid discharge head according to Configuration 1 or 2, wherein the electrical connection portion cover member includes a first elastic member, and contacts the electrical wiring substrate via the first elastic member.

Configuration 4

The liquid discharge head according to Configuration 3, wherein the electrical connection portion cover member includes a rib portion on a back side of a surface on which the first elastic member is disposed.

Configuration 5

The liquid discharge head according to any one of Configurations 2 to 4, wherein the electrical connection portion cover member contacts the electrical wiring substrate at a position opposing a position at which the insertion portion is disposed.

Configuration 6

The liquid discharge head according to any one of Configurations 1 to 5, wherein the housing has an opening portion configured to accommodate the electrical connection portion, wherein the electrical connection portion cover member covers the opening portion, and wherein at least one side of the electrical connection portion cover member contacts the opening portion, in a state where the insertion portion is inserted in the recessed portion.

Configuration 7

The liquid discharge head according to any one of Configurations 1 to 6, wherein at least three sides of the electrical connection portion cover member contact the opening portion.

Configuration 8

The liquid discharge head according to Configuration 7 or 6, wherein a width at which the electrical connection portion cover member contacts the opening portion is 1 mm or more.

Configuration 9

The liquid discharge head according to any one of Configurations 6 to 8, wherein the electrical connection portion cover member and the opening portion contact via a second elastic member.

Configuration 10

The liquid discharge head according to any one of Configurations 6 to 9, wherein at least three sides of the electrical connection portion cover member contacts the opening portion via the second elastic member.

Configuration 11

The liquid discharge head according to Configuration 9, wherein the second elastic member is included in the electrical connection portion cover member.

Configuration 12

The liquid discharge head according to Configuration 9 or 10, wherein the second elastic member is included in the opening portion.

Configuration 13

The liquid discharge head according to any one of Configurations 1 to 12, wherein the housing includes a first protruding portion, and wherein the electrical connection portion cover member includes a first fitting portion into which the first protruding portion fits.

Configuration 14

The liquid discharge head according to any one of Configurations 1 to 13, wherein the electrical connection portion cover member includes a second protruding portion, and wherein the housing includes a second fitting portion into which the second protruding portion fits.

Configuration 15

The liquid discharge head according to Configuration 14, wherein the electrical connection portion cover member includes a lever member extending in a direction to cover the housing, and wherein the lever member includes the second protruding portion.

Configuration 16

The liquid discharge head according to any one of Configurations 1 to 15, wherein the liquid discharge unit includes a recording element substrate including a pressure generation element configured to generate pressure for discharging the liquid, and a flexible wiring substrate electrically connected to the recording element substrate, wherein an electrical relay substrate electrically connected to the flexible wiring substrate and configured to relay power to the flexible wiring substrate is disposed in the housing, and wherein the electrical relay substrate includes, at an end portion thereof, the electrical connection portion.

Configuration 17

The liquid discharge head according to Configuration 16, wherein the pressure generation element is a piezoelectric element to be driven by application of voltage.

Configuration 18

The liquid discharge head according to any one of Configurations 1 to 17, wherein the housing includes a liquid connection portion to be connected to the recording apparatus in terms of liquid.

Configuration 19

The liquid discharge head according to Configuration 18, wherein the electrical connection portion includes at least two electrical connection portions and the electrical connection portion cover member includes at least two electrical connection portion cover members, and wherein the at least two electrical connection portion cover members cover the electrical connection portions in such a manner to sandwich the liquid connection portion.

Configuration 20

The liquid discharge head according to any one of Configurations 1 to 19, further comprising a support member configured to support the liquid discharge unit and connect to the housing, and a seal member configured to seal a gap between the housing and the support member.

Configuration 21

The liquid discharge head according to Configuration 20, wherein the seal member is bonded to the housing.

Configuration 22

The liquid discharge head according to Configuration 20, wherein the seal member is joined to the housing.

Configuration 23

The liquid discharge head according to any one of Configurations 1 to 22, wherein the electrical wiring substrate is a flexible wiring substrate.

Configuration 24

A recording apparatus comprising the liquid discharge head according to any one of Configurations 1 to 23.

According to the present disclosure, it is possible to provide a liquid discharge head capable of reducing a possibility of an electrical connection portion cover member dropping off from a housing of a liquid discharge head while preventing liquid from entering an electrical connection portion of the liquid discharge head, and a recording apparatus using the liquid discharge head.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-094738, filed Jun. 8, 2023, which is hereby incorporated by reference herein in its entirety.

What is claimed is:

1. A liquid discharge head comprising:

a liquid discharge unit configured to discharge liquid;

a housing configured to cover the liquid discharge unit;

an electrical connection portion configured to be electrically connected to an electrical wiring substrate of a recording apparatus;

a connection portion cover member configured to cover the electrical connection portion;

a support member configured to support the liquid discharge unit and connect to the housing; and a seal member configured to seal a gap between the housing and the support member, wherein power is supplied from the recording apparatus to the liquid discharge unit via the electrical connection portion, wherein the housing includes a recessed portion into which the connection portion cover member can be inserted, wherein the connection portion cover member includes an insertion portion insertable into the recessed portion, and wherein the insertion portion is covered by the recessed portion.

2. The liquid discharge head according to claim 1, wherein at least a part of the connection portion cover member contacts the electrical wiring substrate.

3. The liquid discharge head according to claim 2, wherein the connection portion cover member includes a first elastic member and contacts the electrical wiring substrate via the first elastic member.

4. The liquid discharge head according to claim 3, wherein the connection portion cover member includes a rib portion on a back side of a surface on which the first elastic member is disposed.

5. The liquid discharge head according to claim 2, wherein the connection portion cover member contacts the electrical wiring substrate at a position opposing a position at which the insertion portion is disposed.

6. The liquid discharge head according to claim 1, wherein the housing has an opening portion configured to accommodate the electrical connection portion, wherein the connection portion cover member covers the opening portion, and wherein at least one side of the connection portion cover member contacts the opening portion in a state where the insertion portion is inserted in the recessed portion.

7. The liquid discharge head according to claim 6, wherein at least three sides of the connection portion cover member contact the opening portion.

8. The liquid discharge head according to claim 6, wherein a width at which the connection portion cover member contacts the opening portion is 1 mm or more.

9. The liquid discharge head according to claim 6, wherein the connection portion cover member and the opening portion contact via a second elastic member.

10. The liquid discharge head according to claim 9, wherein at least three sides of the connection portion cover member contact the opening portion via the second elastic member.

11. The liquid discharge head according to claim 9, wherein the second elastic member is included in the connection portion cover member.

12. The liquid discharge head according to claim 9, wherein the second elastic member is included in the opening portion.

13. The liquid discharge head according to claim 1,
wherein the housing includes a first protruding portion, and
wherein the connection portion cover member includes a first fitting portion into which the first protruding portion fits.

14. The liquid discharge head according to claim 1,
wherein the connection portion cover member includes a second protruding portion, and
wherein the housing includes a second fitting portion into which the second protruding portion fits.

15. The liquid discharge head according to claim 14,
wherein the connection portion cover member includes a lever member extending in a direction to cover the housing, and
wherein the lever member includes the second protruding portion.

16. The liquid discharge head according to claim 1,
wherein the liquid discharge unit includes a recording element substrate including a pressure generation element configured to generate pressure for discharging the liquid, and a flexible wiring substrate electrically connected to the recording element substrate,
wherein an electrical relay substrate electrically connected to the flexible wiring substrate and configured to relay power to the flexible wiring substrate is disposed in the housing, and
wherein the electrical relay substrate includes, at an end portion of the electrical relay substrate, the electrical connection portion.

17. The liquid discharge head according to claim 16, wherein the pressure generation element is a piezoelectric element to be driven by application of voltage.

18. The liquid discharge head according to claim 1, wherein the housing includes a liquid connection portion to be connected to the recording apparatus in terms of liquid.

19. The liquid discharge head according to claim 18, wherein the liquid discharge head includes at least two electrical connection portions and at least two connection portion cover members, and
wherein the at least two connection portion cover members cover the electrical connection portions in such a manner as to sandwich the liquid connection portion.

20. The liquid discharge head according to claim 1, wherein the seal member is bonded to the housing.

21. The liquid discharge head according to claim 1, wherein the seal member is joined to the housing.

22. The liquid discharge head according to claim 1, wherein the electrical wiring substrate is a flexible wiring substrate.

23. A recording apparatus comprising:
a liquid discharge unit configured to discharge liquid;
a housing configured to cover the liquid discharge unit;
an electrical wiring substrate;
an electrical connection portion configured to be electrically connected to the electrical wiring substrate;
a connection portion cover member configured to cover the electrical connection portion;
a support member configured to support the liquid discharge unit and connect to the housing; and
a seal member configured to seal a gap between the housing and the support member,
wherein power is supplied from the recording apparatus to the liquid discharge unit via the electrical connection portion,
wherein the housing includes a recessed portion into which the connection portion cover member can be inserted,
wherein the connection portion cover member includes an insertion portion insertable into the recessed portion, and
wherein the insertion portion is covered by the recessed portion.

24. A liquid discharge head comprising:
a liquid discharge unit configured to discharge liquid;
a housing configured to cover the liquid discharge unit;
at least two electrical connection portions configured to be electrically connected to at least one electrical wiring substrate of a recording apparatus; and
at least two connection portion cover members configured to cover the electrical connection portions,
wherein power is supplied from the recording apparatus to the liquid discharge unit via the electrical connection portion,
wherein the housing includes a recessed portion into which the connection portion cover member can be inserted,
wherein the housing includes a liquid connection portion to be connected to the recording apparatus in terms of liquid,
wherein the connection portion cover member includes an insertion portion insertable into the recessed portion,
wherein the insertion portion is covered by the recessed portion, and
wherein the at least two connection portion cover members cover the electrical connection portions in such a manner as to sandwich the liquid connection portion.

* * * * *